(12) United States Patent
Imai et al.

(10) Patent No.: US 10,683,785 B2
(45) Date of Patent: Jun. 16, 2020

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi (JP)

(72) Inventors: Daichi Imai, Sunto-gun (JP); Hiroshi Kobayashi, Numazu (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 12 days.

(21) Appl. No.: 16/210,009

(22) Filed: Dec. 5, 2018

(65) Prior Publication Data
US 2019/0195102 A1 Jun. 27, 2019

(30) Foreign Application Priority Data
Dec. 27, 2017 (JP) .................. 2017-252134

(51) Int. Cl.
*F01N 3/20* (2006.01)
*F01N 3/08* (2006.01)
(Continued)

(52) U.S. Cl.
CPC ....... *F01N 3/0814* (2013.01); *B01D 53/9422* (2013.01); *B01D 53/9495* (2013.01);
(Continued)

(58) Field of Classification Search
CPC . B01D 53/9422; F01N 3/0814; F01N 3/0842; F01N 3/0871; F01N 3/206;
(Continued)

(56) References Cited

U.S. PATENT DOCUMENTS

| 6,038,853 | A | 3/2000 | Penetrante et al. |
| 8,650,863 | B2* | 2/2014 | Sobue .................. F01N 3/0814 60/286 |
| 9,010,090 | B2 | 4/2015 | Basaiji et al. |
| 2003/0114300 | A1 | 6/2003 | Twigg |
| 2005/0229589 | A1* | 10/2005 | Murata ................ F01N 3/0871 60/286 |

(Continued)

FOREIGN PATENT DOCUMENTS

| EP | 3 073 078 A2 | 9/2016 |
| JP | 2005-163590 | 6/2005 |
| JP | 2016-186239 | 10/2016 |

OTHER PUBLICATIONS

Office Action dated Jan. 24, 2020 for U.S. Appl. No. 16/210,012.

*Primary Examiner* — Jonathan R Matthias
(74) *Attorney, Agent, or Firm* — Oblon, McClelland, Maier & Neustadt, L.L.P.

(57) ABSTRACT

In an exhaust gas purification apparatus for an internal combustion engine, the apparatus comprising NOx storage reduction catalyst, and a controller comprising at least one processor is configured to carry out rich spike, wherein in cases where the storage amount of NOx is the same, in a period of time from the completion of the execution of the last rich spike to the start of the execution of the current rich spike, the controller makes a period of execution of the current rich spike longer, and/or a degree of richness of a rich air fuel ratio achieved by the execution of the current rich spike larger, in the case where a period of time in which a temperature of the NOx storage reduction catalyst becomes equal to or higher than a predetermined determination temperature is long than in the case where it is short.

3 Claims, 15 Drawing Sheets

(51) Int. Cl.
*F01N 9/00* (2006.01)
*B01D 53/94* (2006.01)
*B60W 10/06* (2006.01)

(52) U.S. Cl.
CPC ........... *B60W 10/06* (2013.01); *F01N 3/0842* (2013.01); *F01N 3/0871* (2013.01); *F01N 9/00* (2013.01); *B01D 2255/1021* (2013.01); *B01D 2255/2042* (2013.01); *B01D 2255/2092* (2013.01); *B01D 2258/012* (2013.01); *F01N 3/0835* (2013.01); *F01N 3/0857* (2013.01); *F01N 2250/12* (2013.01); *F01N 2430/06* (2013.01); *F01N 2560/06* (2013.01); *F01N 2900/0422* (2013.01); *F01N 2900/1402* (2013.01); *F01N 2900/1602* (2013.01); *F01N 2900/1614* (2013.01)

(58) Field of Classification Search
CPC ........... F01N 2560/026; F01N 2570/14; F01N 2900/1614
See application file for complete search history.

(56) References Cited

U.S. PATENT DOCUMENTS

| 2006/0137328 | A1  | 6/2006  | Takeshima et al. |
| 2013/0259778 | A1  | 10/2013 | Doering |
| 2015/0308363 | A1* | 10/2015 | Choi .................... F01N 3/2073 123/703 |
| 2019/0195102 | A1  | 6/2019  | Imai et al. |
| 2019/0195103 | A1  | 6/2019  | Kobayashi et al. |

* cited by examiner

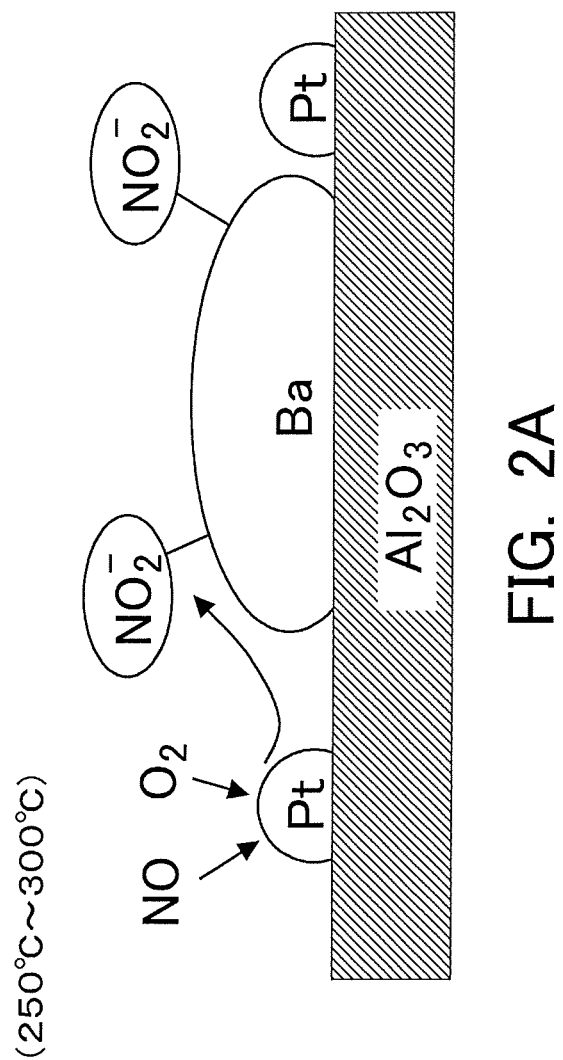

EXHAUST GAS PURIFICATION APPARATUS FOR AN INTERNAL COMBUSTION ENGINE

This application claims the benefit of Japanese Patent Application No. 2017-252134, filed on Dec. 27, 2017, which is hereby incorporated by reference herein in its entirety.

BACKGROUND

Technical Field

The present disclosure relates to an exhaust gas purification apparatus for an internal combustion engine.

Description of the Related Art

There has been known a technique in which an NOx storage reduction catalyst (hereinafter, sometimes also referred to as an "NSR catalyst") is arranged as an exhaust gas purification catalyst in an exhaust passage of an internal combustion engine which performs lean burn operation in which an air fuel ratio of a mixture is adjusted to a lean air fuel ratio higher than a stoichiometric air fuel ratio. The NSR catalyst has a function to store NOx in exhaust gas when the air fuel ratio of its ambient atmosphere is a lean air fuel ratio, as well as to reduce the NOx thus stored when the air fuel ratio of the ambient atmosphere is a rich air fuel ratio lower than the stoichiometric air fuel ratio and when a reducing agent exists. Here, note that in this description, the term "storage" is used as such including a mode of "adsorption".

Then, in the internal combustion engine which is provided with such an NSR catalyst, the NOx stored in the NSR catalyst is reduced by the execution of rich spike which temporarily changes the air fuel ratio of the exhaust gas from a lean air fuel ratio higher than the stoichiometric air fuel ratio to a rich air fuel ratio lower than the stoichiometric air fuel ratio.

In patent literature 1, there is disclosed a technique in which rich spike is carried out when an amount of NOx trapped by an NOx trap catalyst reaches a predetermined amount.

In addition, in patent literature 2, there is disclosed a technology in which in an exhaust gas purification control device which carries out a rich spike operation in cases where an amount of NOx stored in an NSR catalyst exceeds a first threshold value, when the storage amount of NOx exceeds a second threshold value larger than the first threshold value, the rich spike operation is carried out at an air fuel ratio of the exhaust gas leaner than in the case where the storage amount of NOx is equal to or less than the second threshold value.

CITATION LIST

Patent Literature

Patent Literature 1: Japanese patent application laid-open publication No. 2005-163590
Patent Literature 2: Japanese patent application laid-open publication No. 2016-186239

SUMMARY

In the past, there has been known a technique in which rich spike is carried out based on an amount of NOx stored in an NSR catalyst (a storage amount of NOx). However, it has been found that even if the rich spike is carried out based on the storage amount of NOx, there is a fear that the NOx stored in the NSR catalyst can not be reduced to a sufficient extent. Specifically, it has been found that even if the storage amount of NOx and the temperature of the NSR catalyst at the time when the rich spike is carried out are the same, a situation where the NOx stored in the NSR catalyst is not sufficiently reduced by the execution of the rich spike may occur resulting from the storage mode of the NOx in the NSR catalyst.

The present disclosure has been made in view of the above-mentioned problems, and has for its object to provide a technique which makes it possible to reduce NOx stored in an NSR catalyst in a suitable manner by carrying out rich spike.

The present disclosure is directed to an exhaust gas purification apparatus for an internal combustion engine which performs lean-burn operation, the apparatus may comprising: an NOx storage reduction catalyst that is arranged in an exhaust passage of the internal combustion engine; a controller comprising at least one processor is configured to carry out rich spike to temporarily change an air fuel ratio of an exhaust gas flowing into the NOx storage reduction catalyst from a lean air fuel ratio higher than a stoichiometric air fuel ratio into a rich air fuel ratio lower than the stoichiometric air fuel ratio; wherein the controller calculates a storage amount of NOx which is an amount of NOx stored in the NOx storage reduction catalyst.

In such an exhaust gas purification apparatus, most of the NOx discharged from the internal combustion engine may be stored in the NOx storage reduction catalyst (hereinafter, sometimes also referred to as an "NSR catalyst"). Then, when rich spike is carried out, the NOx stored in the NSR catalyst (hereinafter, sometimes also referred to as "the stored NOx") can be reduced by a reducing agent such as CO, HC, etc., contained in the exhaust gas of a rich air fuel ratio. Here, with respect to the reduction of the stored NOx by the rich spike, it has been found that the easiness in the reduction of the stored NOx changes with a temperature history of the NSR catalyst in a period of time from the completion of the execution of the last rich spike to the start of the execution of the current rich spike (hereinafter, sometimes also referred to as a "determination period of time"). Accordingly, when the rich spike is carried out, if the rich spike is carried out only based on the storage amount of NOx without depending on the temperature history of the NSR catalyst in the determination period of time, there is a fear that the stored NOx may not be reduced to a sufficient extent.

Then, as a result of an earnest study, the present inventor has newly found that the storage mode of NOx in the NSR catalyst changes according to the temperature of the NSR catalyst at the time when NOx is stored into the NSR catalyst. Moreover, it has also been known that the easiness in the reduction of the stored NOx by the rich spike changes resulting from this change of the storage mode. Specifically, it has been found that in cases where the temperature of the NSR catalyst is relatively low, the NOx having flowed into the NSR catalyst has a tendency to be stored into the NSR catalyst in a mode easy to be reduced by the reducing agent (hereinafter, sometimes also referred to as a "first mode"). On the other hand, it has been found that in cases where the temperature of the NSR catalyst is relatively high, the NOx having flowed into the NSR catalyst has a tendency to be stored into the NSR catalyst in a mode hard to be reduced by the reducing agent (hereinafter, sometimes also referred to as a "second mode").

Here, note that the storage mode of the NOx already stored in the NSR catalyst may further change according to a change in the temperature of the NSR catalyst after the storage of the NOx. In other words, the storage mode of the NOx in the NSR catalyst may change according to the temperature history of the NSR catalyst in the determination period of time.

Accordingly, in an exhaust gas purification apparatus for an internal combustion engine according to a first aspect of the present disclosure, the controller may carry out the following control. That is, in cases where the storage amount of NOx is the same, in the period of time from the completion of the execution of the last rich spike to the start of the execution of the current rich spike, the controller may make a period of execution of the current rich spike longer, and/or a degree of richness of the rich air fuel ratio achieved by the execution of the current rich spike larger, in the case where a period of time in which the temperature of the NOx storage reduction catalyst becomes equal to or higher than a predetermined determination temperature is long than in the case where it is short.

Here, the predetermined determination temperature is defined as a temperature at which NOx can be stored into the NSR catalyst in the second mode, when the temperature of the NSR catalyst becomes equal to or higher than the determination temperature. Accordingly, in the NSR catalyst of which the temperature has become equal to or higher than the predetermined determination temperature, there is a tendency that NOx is stored into the NSR catalyst in the second mode. In addition, in such an NSR catalyst, the storage mode of the NOx already stored in the NSR catalyst may change from the first mode to the second mode. Then, the stored NOx of the second mode becomes easier to be formed in the case where a period of time in which the temperature of the NSR catalyst becomes equal to or higher than the predetermined determination temperature (hereinafter, sometimes also referred to as a "catalyst high temperature period") within the determination period of time is long than in the case where it is short.

Then, in cases where the storage amount of NOx is the same, the more the stored NOx of the second mode in the stored NOx, the harder the stored NOx becomes to be reduced by the rich spike. Accordingly, the controller may control such that in cases where the storage amount of NOx is the same, the period of execution of the rich spike is made longer, and/or the degree of richness of the rich air fuel ratio achieved by the execution of the rich spike is made larger, in the case where the catalyst high temperature period is long than in the case where it is short. Here, when the period of execution of the rich spike is made longer, the stored NOx can be reduced, even in cases where the reaction rate of the reduction reaction of the stored NOx is relatively slow and a relatively long period of time is required for the reduction of the stored NOx. In this case, even if the rich spike is carried out so that a total amount of the reducing agent supplied to the NSR catalyst by the execution of the rich spike becomes the same irrespective of the period of execution of the rich spike, i.e., when the period of execution of the rich spike is made longer than usual, even if the degree of richness of the rich air fuel ratio achieved by the execution of the rich spike is made smaller than usual, the stored NOx becomes easy to be reduced, when the period of execution of the rich spike is made longer. Here, it is a matter of course that if the period of execution of the rich spike is made longer while the degree of richness of the rich air fuel ratio achieved by the execution of the rich spike is maintained as usual, the stored NOx becomes easy to be reduced.

In addition, when the degree of richness of the rich air fuel ratio achieved by the execution of the rich spike is made larger, the amount of the reducing agent supplied to the NSR catalyst by the execution of the rich spike relatively increases, and so the stored NOx becomes easy to be reduced. In other words, when the controller carries out the above-mentioned control, it becomes possible to reduce not only the NOx stored in the NSR catalyst in the first mode but also the NOx stored in the NSR catalyst in the second mode, by means of the rich spike. As a result of this, a situation where the stored NOx is not sufficiently reduced even by execution of the rich spike is suppressed, thus making it possible to reduce the NOx stored in the NSR catalyst in an appropriate manner by the execution of the rich spike.

Here, the higher the temperature of the NSR catalyst, the easier it becomes for NOx to be stored into the NSR catalyst in the second mode. For that reason, even if the catalyst high temperature period is the same, the higher than the predetermined determination temperature the temperature of the NSR catalyst at that time becomes, the easier it becomes for NOx to be stored into the NSR catalyst in the second mode. Then, when the NOx of the second mode in the stored NOx increases, a situation where the stored NOx is not reduced to a sufficient extent becomes easy to occur.

Accordingly, in the exhaust gas purification apparatus for an internal combustion engine, in cases where the storage amount of NOx is the same, in the period of time from the completion of the execution of the last rich spike to the start of the execution of the current rich spike, the controller may make the period of execution of the current rich spike longer, and/or may make the degree of richness of the rich air fuel ratio achieved by the execution of the current rich spike larger, in the case where a mean temperature of the NOx storage reduction catalyst at the time when the temperature of the NOx storage reduction catalyst becomes higher than the predetermined determination temperature is high than in the case where it is low. Thus, even if the catalyst high temperature period is relatively short but the mean temperature of the NSR catalyst in the catalyst high temperature period becomes considerably higher than the predetermined determination temperature so that the amount of NOx of the second mode in the stored NOx becomes relatively large, the stored NOx can be reduced in an appropriate manner. In other words, it becomes possible to reduce the NOx stored in the NSR catalyst in an appropriate manner by the execution of the rich spike.

Next, reference will be made to an exhaust gas purification apparatus for an internal combustion engine according to a second aspect of the present disclosure. It has been found that the NOx stored in the NSR catalyst in the first mode described in the explanation of the above-mentioned first aspect of the present disclosure is nitrites, and that the nitrites are stored into the NSR catalyst by a relatively weak adsorption force. On the other hand, it has also been found that the NOx stored in the NSR catalyst in the second mode is nitrates, and that the nitrates are stored into the NSR catalyst by an adsorption force which is stronger than that of the nitrites. Accordingly, when reducing the NOx stored in the NSR catalyst by the rich spike, the nitrates stored in the NSR catalyst become harder to be reduced than the nitrites stored in the NSR catalyst.

In view of the above, when a ratio of an amount of the nitrates stored in the NSR catalyst (hereinafter, sometimes referred to as a "storage amount of nitrates") with respect to the storage amount of NOx is defined as a nitrate ratio, even if the storage amount of NOx is the same, the stored NOx tends to become harder in the case where the rich spike is carried out in a state where the nitrate ratio is high, in comparison with the case where the rich spike is carried out in a state where the nitrate ratio is low.

Accordingly, the exhaust gas purification apparatus for an internal combustion engine according to the second aspect of the present disclosure may comprise: an NOx storage reduction catalyst that is arranged in an exhaust passage of the internal combustion engine; and a controller comprising at least one processor is configured to carry out rich spike to temporarily change an air fuel ratio of an exhaust gas flowing into the NOx storage reduction catalyst from a lean air fuel ratio higher than a stoichiometric air fuel ratio into a rich air fuel ratio lower than the stoichiometric air fuel ratio; wherein the controller calculates a storage amount of NOx which is an amount of NOx stored in the NOx storage reduction catalyst; the controller calculates, based on a temperature of the NOx storage reduction catalyst, a storage amount of nitrates which is an amount of nitrates stored in the NOx storage reduction catalyst; and the controller calculates a nitrate ratio, which is a ratio of the storage amount of nitrates with respect to the storage amount of NOx, based on the storage amount of NOx and the storage amount of nitrates. Then, in cases where the storage amount of NOx is the same, the controller may make the period of execution of the rich spike longer, and/or makes the degree of richness of the rich air fuel ratio achieved by the execution of the current rich spike larger, in the case where the nitrate ratio is high than in the case where it is low.

Here, whether the NOx having flowed into the NSR catalyst becomes easy to turn into nitrites and to be stored in the NSR catalyst, or it becomes easy to further turn from nitrites into nitrates and to be stored in the NSR catalyst, changes according to the temperature of the NSR catalyst. Accordingly, the storage amount of nitrates will change according to the temperature of the NSR catalyst. Then, in cases where the storage amount of NOx is the same, when the temperature of the NSR catalyst becomes relatively high and the storage amount of nitrates increases, the nitrate ratio becomes higher in comparison with when the temperature of the NSR catalyst is relatively low. For example, in the determination period of time described in the explanation of the above-mentioned first aspect of the present disclosure, in cases where the storage amount of NOx is the same, the nitrate ratio tends to become higher, as a period of time in which the temperature of the NSR catalyst is relatively high becomes longer.

Then, even if the storage amount of NOx is the same, the controller can make the period of execution of the rich spike longer, and/or can make the degree of richness of the rich air fuel ratio achieved by the execution of the rich spike larger, in the case where the nitrate ratio is high than in the case where it is low. As a result of this, even in the case where the rich spike is carried out in a state where the nitrate ratio is high, the stored NOx can be reduced, as in the case where the rich spike is carried out in a state where the nitrate ratio is low. In other words, it becomes possible to reduce the NOx stored in the NSR catalyst in an appropriate manner by the execution of the rich spike.

According to the present disclosure, the NOx stored in an NSR catalyst can be reduced in an appropriate manner by the execution of rich spike.

BRIEF DESCRIPTION OF DRAWINGS

FIG. 2A is a view for explaining a storage mode of NOx in the case where the temperature of the NSR catalyst is relatively low.

DESCRIPTION OF THE EMBODIMENTS

Hereinafter, modes (or embodiments) for carrying out the present disclosure will be described in detail by way of example with reference to the attached drawings. However, the dimensions, materials, shapes, relative arrangements and so on of component parts described in the embodiments are not intended to limit the scope of the present disclosure to these alone in particular as long as there are no specific statements.

First Embodiment

Construction of Intake and Exhaust Systems of Internal Combustion Engine

Figure 1:
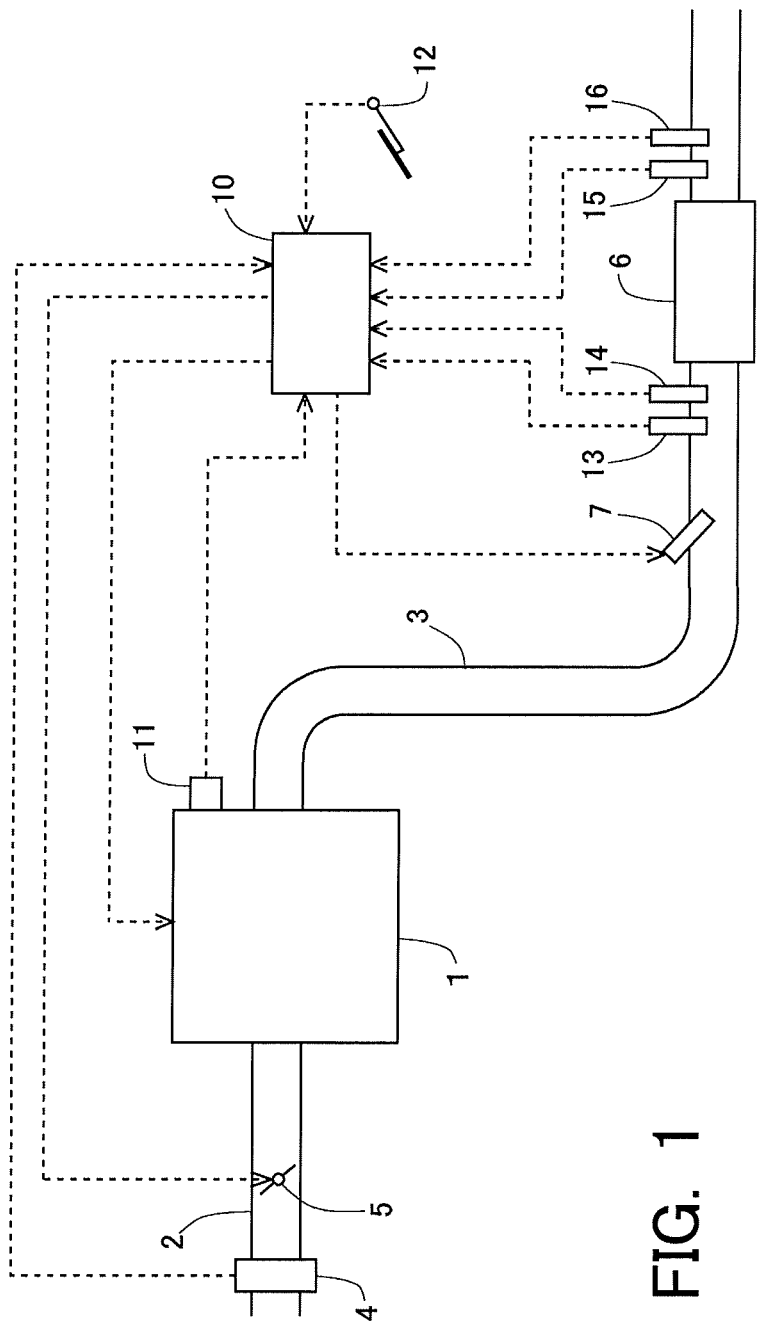
FIG. 1 is a view indicating the schematic construction of an intake system and an exhaust system of an internal combustion engine according to a first embodiment of the present disclosure.

FIG. 1 is a view indicating the schematic construction of an intake system and an exhaust system of an internal combustion engine according to a first embodiment of the present disclosure. The internal combustion engine 1 indicated in FIG. 1 is an internal combustion engine of compression ignition type (diesel engine). However, the present disclosure can also be applied to a lean burn internal combustion engine of spark ignition type which uses gasoline or the like as fuel.

An intake passage 2 and an exhaust passage 3 are connected to the internal combustion engine 1. An air flow meter 4 is arranged in the intake passage 2. The air flow meter 4 serves to detect an amount of intake air sucked into the internal combustion engine 1. Also, a throttle valve 5 is arranged in the intake passage 2 at the downstream side of the air flow meter 4. The throttle valve 5 serves to control the amount of intake air in the internal combustion engine 1 by changing the channel cross section of the intake passage 2.

In the exhaust passage 3, there is arranged an NOx storage reduction catalyst 6 (hereinafter, sometimes also referred to as an NSR catalyst 6) as an exhaust gas purification catalyst. Here, note that in the exhaust passage 3, there may be arranged an NOx selective catalytic reduction catalyst and/or a particulate filter, in addition to the NSR catalyst 6. A fuel addition valve 7 is arranged in the exhaust passage 3 at the upstream side of the NSR catalyst 6. The fuel addition valve 7 serves to add fuel into exhaust gas. The fuel added from the fuel addition valve 7 is supplied to the NSR catalyst 6 along with the exhaust gas.

In addition, an upstream side NOx sensor 13 and an air fuel ratio sensor 14 are arranged in the exhaust passage 3 at the downstream side of the fuel addition valve 7 and at the upstream side of the NSR catalyst 6. The upstream side NOx sensor 13 detects the concentration of NOx in the exhaust gas flowing into the NSR catalyst 6 (hereinafter, sometimes also referred to as an "incoming exhaust gas"). The air fuel ratio sensor 14 detects the air fuel ratio of the incoming exhaust gas. Moreover, a downstream side NOx sensor 15 and a temperature sensor 16 are arranged in the exhaust passage 3 at the downstream side of the NSR catalyst 6. The downstream side NOx sensor 15 detects the concentration of NOx in the exhaust gas flowing out from the NSR catalyst 6 (hereinafter, sometimes also referred to as an "outgoing exhaust gas"). The temperature sensor 16 detects the temperature of the outgoing exhaust gas.

In the internal combustion engine 1, there is arranged in combination therewith an electronic control unit (ECU) 10 for controlling the internal combustion engine 1. The air flow meter 4, the upstream side NOx sensor 13, the air fuel ratio sensor 14, the downstream side NOx sensor 15 and the temperature sensor 16 are electrically connected to the ECU 10. Further, a crank angle sensor 11 and an accelerator opening sensor 12 are electrically connected to the ECU 10. The crank angle sensor 11 outputs a signal having a correlation with a crank angle of the internal combustion engine 1. The accelerator opening sensor 12 outputs a signal having a correlation with an opening degree of an accelerator of a vehicle on which the internal combustion engine 1 is mounted.

Then, output values or signals of these individual sensors are inputted to the ECU 10. The ECU 10 derives the rotation speed of the internal combustion engine 1 based on the output value of the crank angle sensor 11. Also, the ECU 10 derives the engine load of the internal combustion engine 1 based on the output value of the accelerator opening sensor 12. In addition, the ECU 10 estimates the flow rate of the exhaust gas (hereinafter, sometimes also referred to as an "exhaust gas flow rate") based on the output value of the air flow meter 4, and calculates the flow rate of NOx flowing into the NSR catalyst 6 (hereinafter, sometimes also referred to as an "NOx incoming flow rate") based on the exhaust gas flow rate and the output value of the upstream side NOx sensor 13, and calculates the flow rate of NOx flowing out from the NSR catalyst 6 (hereinafter, sometimes also referred to as an "NOx outgoing flow rate") based on the exhaust gas flow rate and the output value of the downstream side NOx sensor 15. Moreover, the ECU 10 estimates the temperature of the NSR catalyst 6 (hereinafter, sometimes also referred to as a "catalyst temperature") based on the output value of the temperature sensor 16.

Further, fuel injection valves (illustration omitted) of the internal combustion engine 1, the throttle valve 5 and the fuel addition valve 7 are electrically connected to the ECU 10. Thus, these parts are controlled by the ECU 10. Here, the ECU 10 carries out processing to temporarily change the air fuel ratio of the exhaust gas flowing into the NSR catalyst 6 from a lean air fuel ratio higher than a stoichiometric air fuel ratio into a rich air fuel ratio lower than the stoichiometric air fuel ratio (hereinafter, sometimes also referred to as "rich spike processing". In this embodiment, the ECU 10 can form a rich air fuel ratio in the rich spike processing by adding fuel into the exhaust gas discharged from the internal combustion engine 1 with the use of the fuel addition valve 7. However, in this embodiment, there is no intention limited to such a case, and the ECU 10 can form the rich air fuel ratio in the rich spike processing by using well-known techniques. For example, the ECU 10 may form the rich air fuel ratio in the rich spike processing by performing rich combustion in which a rich mixture is formed in a cylinder by using a fuel injection valve (illustration omitted) of the internal combustion engine 1, so that the rich mixture thus formed is combusted in the cylinder.

Storage & Reduction Mechanism of NOx in the NSR Catalyst

When the rich spike processing is carried out, a reducing agent such as HC, CO, etc., is supplied to the NSR catalyst 6. Then, the NOx stored in the NSR catalyst 6 (hereinafter, sometimes also referred to as the "stored NOx") is reduced by this reducing agent. For example, in cases where the rich spike processing is carried out by the addition of fuel from the fuel addition valve 7, the stored NOx is mainly reduced by HC. In addition, for example, in cases where the rich spike processing is carried out by the rich combustion performed in each cylinder, the stored NOx is mainly reduced by CO and HC.

Then, in the past, there has been known a technique in which rich spike processing is carried out when an amount of stored NOx reaches a predetermined amount, but in this case, it has been found that a situation may occur where the stored NOx can not be reduced to a sufficient extent. Then, as a result of an earnest study, the present inventor has found out that such a situation occurs, resulting from the storage mode of the NOx in the NSR catalyst 6. This will be explained below. Here, note that the amount of the NOx stored in the NSR catalyst 6 (the stored NOx) is hereinafter referred to as a "storage amount of NOx".

Figure 2B:
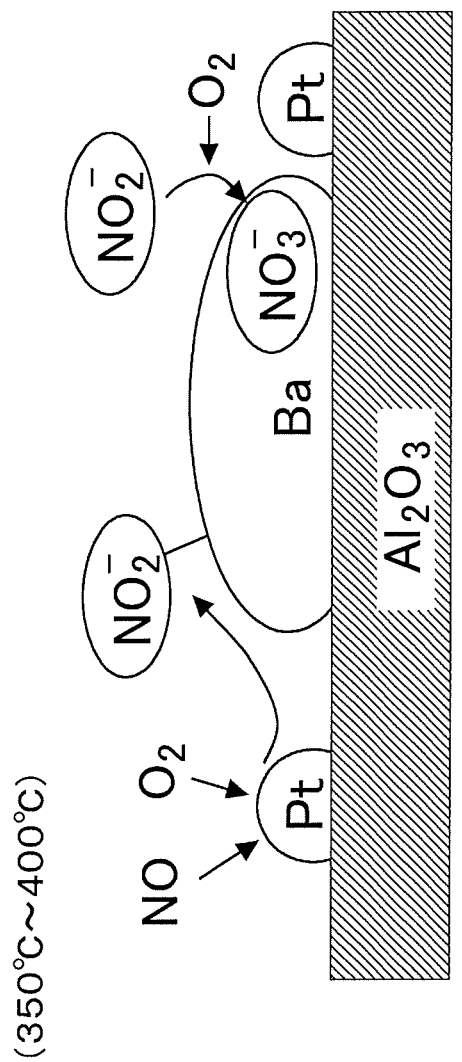
FIG. 2B is a view for explaining a storage mode of NOx in the case where the temperature of the NSR catalyst is relatively high.

A mechanism estimated for an NOx storage mechanism in the NSR catalyst 6, newly considered by the present inventor, will be explained based on FIG. 2A and FIG. 2B. FIG. 2A and FIG. 2B are views for explaining the storage mode of NOx in the NSR catalyst 6.

Here, the storage mode of NOx will be explained by exemplifying a case where in the NSR catalyst 6, there are used alumina ($Al_2O_3$) as a carrier, and Pt as a precious metal catalyst, and Ba as an NOx storage material. In the NSR catalyst 6, NOx, which has been caused to react with oxygen in the presence of Pt which promotes the reaction of NOx and oxygen, is stored in Ba. Here, it has been newly found out that when NOx is stored in Ba, the storage mode thereof changes with the temperature of the NSR catalyst 6.

FIG. 2A is a view for explaining the storage mode of NOx in the case where the temperature of the NSR catalyst 6 is relatively low (e.g., from 250 degrees C. to 300 degrees C.). In an example indicated in FIG. 2A, the NO having flowed into the NSR catalyst 6 is caused to react with oxygen in the presence of Pt. In that case, NO turns into nitrites ($NO_2^-$). Then, the nitrites are stored into Ba by a relatively weak adsorption force.

On the other hand, FIG. 2B is a view for explaining the storage mode of NOx in the case where the temperature of the NSR catalyst 6 is relatively high (e.g., from 350 degrees C. to 400 degrees C.). In an example shown in FIG. 2B, too, similarly to the example indicated in FIG. 2A, the NO having flowed into the NSR catalyst 6 is caused to react with oxygen in the presence of Pt thereby to generate nitrites ($NO_2^-$), as a result of which the nitrites thus generated are stored into Ba by a relatively weak adsorption force. Here, it has been found out that in cases where the temperature of the NSR catalyst 6 is relatively high, a part (or all) of the nitrites stored in Ba is further caused to react with oxygen thereby to turn into nitrates ($NO_3^-$), which are then stored in Ba by a relatively strong adsorption force. In other words, the storage mode of the NOx already stored in Ba can further change according to a change in the temperature of the NSR catalyst 6 after the storage of the NOx. Here, note that the reaction temperature at which a reaction progresses from nitrites to nitrates may change with the deterioration state of Pt, etc., which promotes the reaction of NOx and oxygen. For example, when Pt deteriorates, the above-mentioned reaction temperature tends to become high.

Thus, the storage mode of the NOx in the NSR catalyst 6 changes according to the temperature of the NSR catalyst 6. Here, note that the stored NOx (the NOx stored in the NSR catalyst 6) contains nitrates and nitrites as referred to above. Accordingly, the storage amount of NOx is the amount of nitrites and nitrates stored in the NSR catalyst 6.

Figure 3:
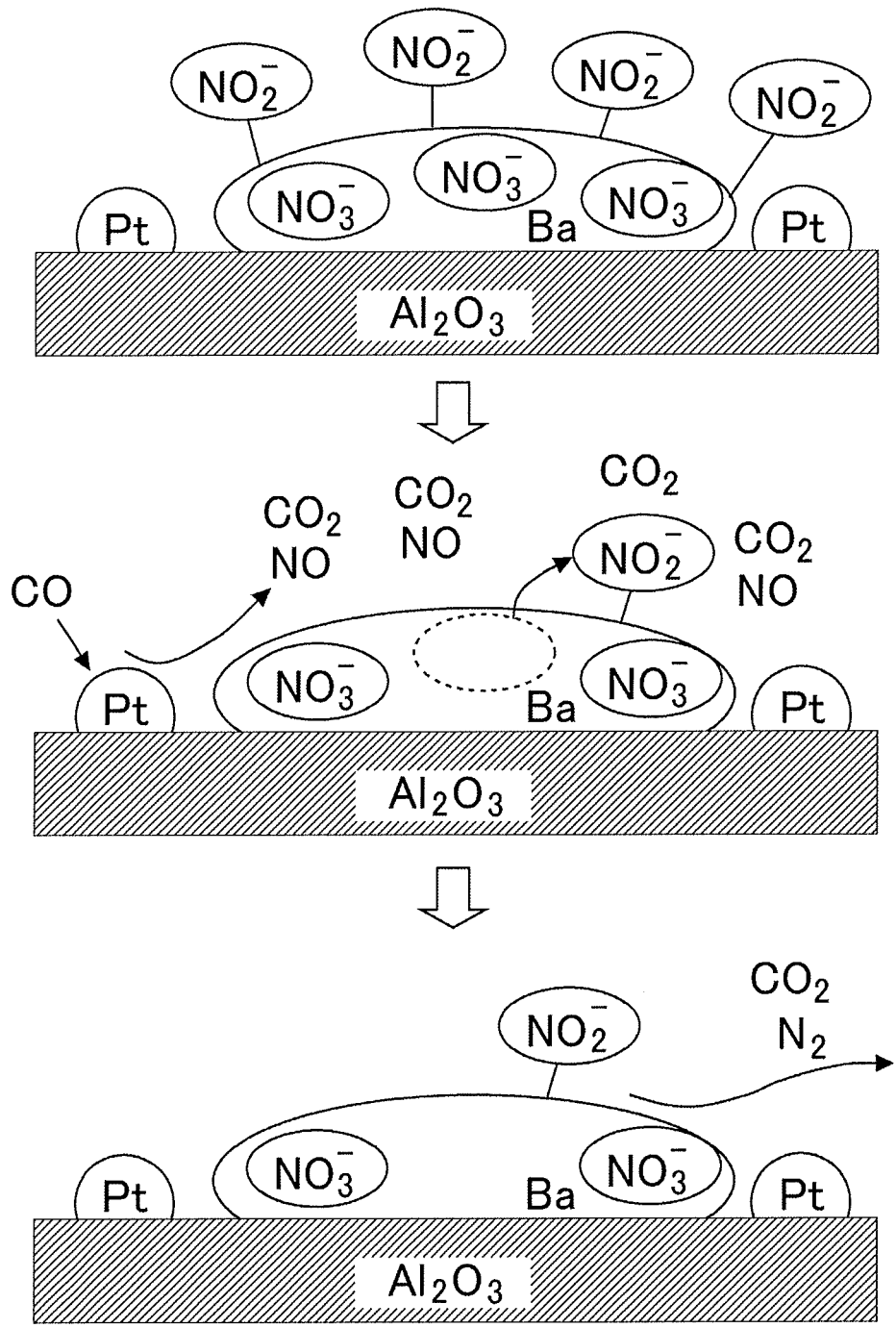
FIG. 3 is a schematic diagram indicating an estimated NOx reduction mechanism in the NSR catalyst.

Then, when the stored NOx is reduced by the execution of the rich spike processing, the nitrates stored in the NSR catalyst 6 become harder to be reduced than the nitrites stored in the NSR catalyst 6. This is illustrated by schematic diagrams indicating the estimated reduction mechanism of NOx in the NSR catalyst 6 at the time of the execution of the rich spike processing indicated in FIG. 3. In FIG. 3, the schematic diagrams in the top, middle and bottom rows represent states before, during and after the execution of the rich spike processing, respectively.

As indicated in the top row of FIG. 3, nitrites and nitrates are stored in the storage material Ba. Then, when CO is supplied as the reducing agent to such an NSR catalyst 6, the nitrites are reduced to NO, as indicated in the middle row of FIG. 3. In addition, a part of the nitrates is reduced to nitrites. Here, as mentioned above, the adsorption force between the nitrites and Ba is relatively weak, so the nitrites stored in Ba can be reduced easily. On the other hand, the adsorption force between the nitrates and Ba is relatively strong, so the nitrates stored in Ba becomes hard to be reduced. As a result, as indicated in the bottom row in FIG. 3, the nitrites having been stored in Ba before the execution of the rich spike processing are reduced up to $N_2$ to desorb from the NSR catalyst 6, but in contrast to this, the nitrates having been stored in Ba before the execution of the rich spike processing may continue to be stored in the NSR catalyst 6, without being reduced at all or without being reduced up to $N_2$ even if reduced.

Rich Spike Processing

As explained above, the storage mode of the NOx in the NSR catalyst 6 changes according to the temperature of the NSR catalyst 6 (the catalyst temperature). Then, in cases where the catalyst temperature is relatively high, the nitrates stored in the NSR catalyst 6 become harder to be reduced than the nitrites stored in the NSR catalyst 6. Accordingly, when a period of time from the completion of the execution of the last rich spike to the start of the execution of the current rich spike is defined as a determination period of time, the easiness in the reduction of the stored NOx by the rich spike processing will change according to the history of the catalyst temperature in the determination period of time. Thus, when the rich spike processing is carried out, if the rich spike processing is carried out only based on the storage amount of NOx without depending on the history of the catalyst temperature in the determination period of time, there is a fear that the stored NOx may not be reduced to a sufficient extent.

Accordingly, in the exhaust gas purification apparatus for an internal combustion engine according to the present disclosure, the ECU 10 carries out the rich spike processing based on a period of time in which the catalyst temperature becomes equal to or higher than a predetermined determination temperature (hereinafter, sometimes also referred to as a "catalyst high temperature period") within the determination period of time. Here, note that the predetermined determination temperature is defined as a temperature at which NOx can turn into nitrates and can be stored into the NSR catalyst 6, when the catalyst temperature becomes equal to or higher than the determination temperature.

Here, NOx becomes easier to turn into nitrates and to be stored into the NSR catalyst 6, in the case where the catalyst high temperature period is long than in the case where it is short. Then, in cases where the storage amount of NOx is the same, the more the nitrates in the stored NOx, the harder the stored NOx becomes to be reduced by the rich spike processing. In other words, the longer the catalyst high temperature period, the harder the stored NOx becomes to be reduced by the rich spike processing. At this time, the reaction rate of the reduction reaction of the stored NOx is relatively slow, and in cases where the storage amount of NOx is the same, there is a tendency that the longer the catalyst high temperature period, the longer a period of time required for the reduction of the stored NOx becomes. Accordingly, in this embodiment, in cases where the storage amount of NOx is the same, the ECU 10 makes a period of execution of the rich spike processing longer in the case where the catalyst high temperature period is long than in the case where it is short. As a result of this, a situation where the stored NOx is not sufficiently reduced even by the execution of the rich spike processing is suppressed, whereby the stored NOx can be reduced in an appropriate manner by the execution of the rich spike processing.

Figure 4:
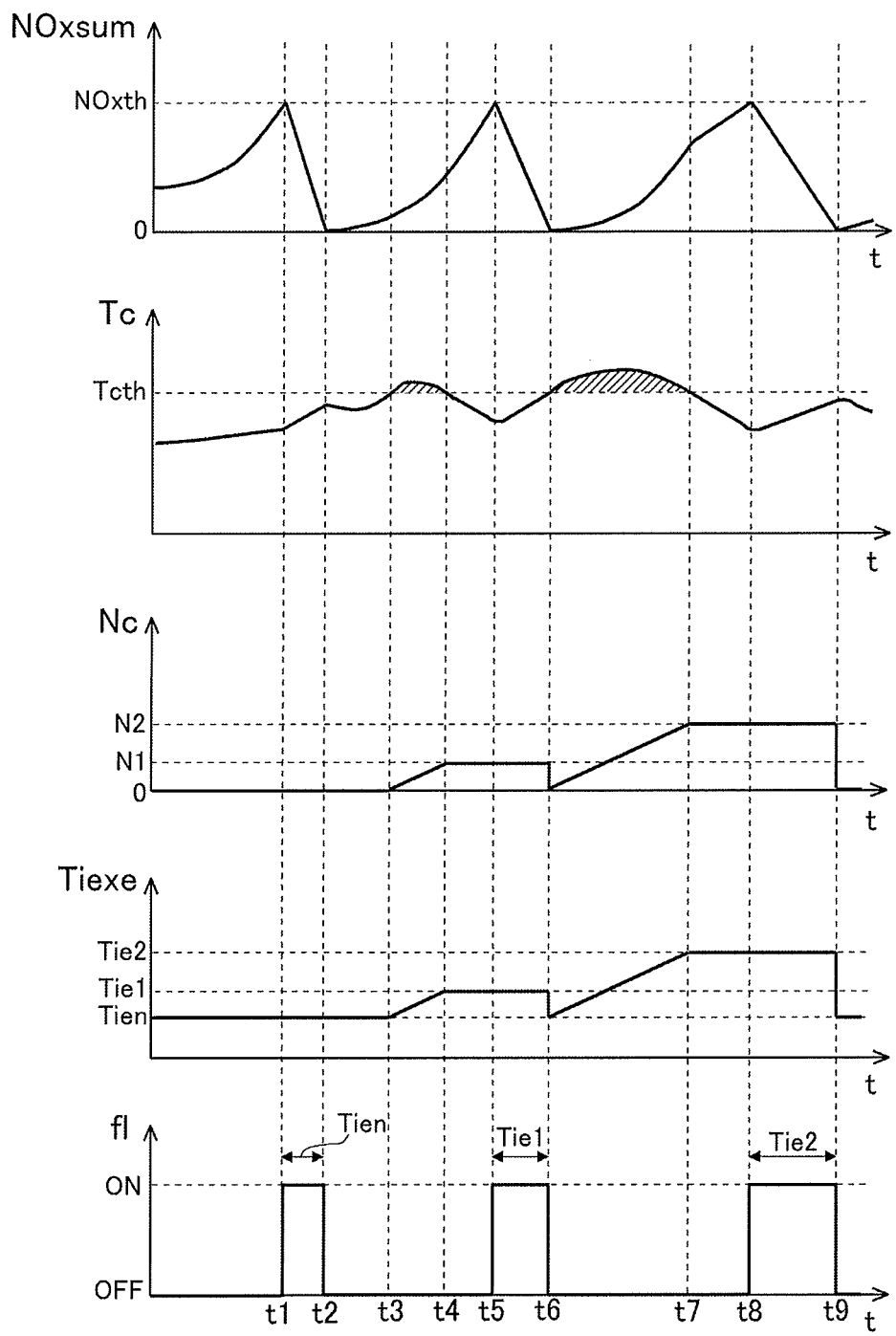
FIG. 4 is a time chart indicating the changes over time of a storage amount of NOx, a catalyst temperature, a high temperature counter, a period of execution, and an execution flag according to the first embodiment of the present disclosure.

Here, a brief explanation will be given to the control processing executed by the ECU 10 in this embodiment, by using a time chart indicated in FIG. 4. FIG. 4 is the time chart indicating the changes over time of a storage amount of NOx NOxsum, a catalyst temperature Tc, a high temperature counter Nc which is a counter for counting the period of time in which the catalyst temperature becomes equal to or higher than the determination temperature, a period of execution of the rich spike processing (hereinafter, sometimes also referred to simply as a "period of execution") Tiexe, and an execution flag fl which is a flag indicating whether the rich spike processing is carried out. Here, note that in the control of this embodiment indicated in FIG. 4, when the storage amount of NOx reaches a reference amount NOxth, the rich spike processing is carried out. Here, the reference amount NOxth is a threshold value which determines an execution timing of the rich spike processing.

As indicated in FIG. 4, at a time point t1 at which the storage amount of NOx becomes the reference amount NOxth, the execution flag is set to ON. Here, in a period of time before the time point t1, the catalyst temperature has not become equal to or higher than the determination temperature Tcth. For that reason, the high temperature counter at the time point t1 has become zero. Here, note that the determination temperature Tcth is defined as a temperature at which NOx can turn into nitrates and can be stored into the NSR catalyst 6, when the catalyst temperature becomes equal to or higher than the determination temperature Tcth, as mentioned above.

In this embodiment, in cases where the storage amount of NOx is the same, the period of execution is made longer in the case where the catalyst high temperature period is long than in the case where it is short, as mentioned above. Here, at the time point t1, the high temperature counter has become zero, so the catalyst high temperature period is 0. In this case, the period of execution is set to a normal period of execution Tien. In addition, at the time point t1, the rich spike processing is started, and the rich spike processing is continued from the time point t1 to a time point t2 which is after the lapse of the normal period of execution Tien. Here, note that when the execution of the rich spike processing is completed, the storage amount of NOx becomes an amount in the vicinity of 0.

Here, when attention is focused on a determination period of time (i.e., a period of time from the time point t2 to a time point t5) from the completion of the execution of rich spike processing started at the time point t1 (i.e., the last rich spike processing) to the start of the execution of rich spike processing at the time point t5 (i.e., the current rich spike processing), the catalyst temperature is equal to or higher than the determination temperature Tcth in a period of time from a time point t3 to a time point t4, as indicated in FIG. 4. In that case, at the time point t3, the counting of time by the high temperature counter is started, and at the time point t4, the high temperature counter becomes N1. Then, as the value of the high temperature counter is increased, i.e., as the catalyst high temperature period becomes longer, the period of execution is made longer from the normal period of execution Tien, and the period of execution is set to Tie1 at the time point t4. Here, note that in a period of time from the time point t4 to the time point t5, the catalyst temperature is less than the determination temperature Tcth, so the counting of time by the high temperature counter is not carried out.

Then, at the time point t5, the rich spike processing is started, and the rich spike processing is continued from the time point t5 to a time point t6 which is after the lapse of the period of execution Tie1. In this case, the period of execution Tie1 of the current rich spike processing is made longer than the period of execution Tien of the last rich spike processing. As a result of this, the nitrates, which can be stored into the NSR catalyst 6 in the period of time from the time point t3 to the time point t4 in which the catalyst temperature becomes equal to or higher than the determination temperature Tcth, can be reduced in an appropriate manner. Here, note that when the execution of the rich spike processing is completed, the high temperature counter is initialized to 0 and the period of execution is also initialized accordingly to the normal period of execution Tien.

On the other hand, when attention is focused on a determination period of time from the completion of the execution of rich spike processing started at the time point t5 to the start of the execution of the rich spike processing at a time point t8 (i.e., a period of time from the time point t6 to the time point t8), the catalyst temperature is equal to or higher than the determination temperature Tcth in a period of time from the time point t6 to a time point t7, as indicated in FIG. 4. In that case, at the time point t6, the counting of time by the high temperature counter is started, and at the time point t7, the high temperature counter becomes N2. Then, at the time point t7, the period of execution is accordingly set to Tie2. Here, note that in a period of time from the time point t7 to the time point t8, the catalyst temperature is less than the determination temperature Tcth, the counting of time by the high temperature counter is not carried out.

Then, at the time point t8, the rich spike processing is started, and the rich spike processing is continued from the time point t8 to a time point t9 which is after the lapse of the period of execution Tie2. Here, the value N2 of the high temperature counter related to the rich spike processing started at the time point t8 is larger than the value N1 of the high temperature counter related to the rich spike processing started at the time point t5. That is, the catalyst high temperature period in a determination period of time from the time point t6 to the time point t8 is longer than that in a determination period of time from the time point t2 to the time point t5. Accordingly, in the determination period of time from the time point t6 to the time point t8, nitrates become easier to be stored into the NSR catalyst 6 than in the determination period of time from the time point t2 to the time point t5. Thus, the period of execution of the rich spike processing Tie2 started at the time point t8 is made longer than the period of execution of the rich spike processing Tie1 started at the time point t5. As a result, the nitrates can be reduced in a suitable manner.

Thus, in this embodiment, in cases where the storage amount of NOx is the same, the period of execution is made longer in the case where the catalyst high temperature period is long than in the case where it is short. This makes it possible to reduce the stored NOx in an appropriate manner by means of the rich spike processing.

Figure 5:
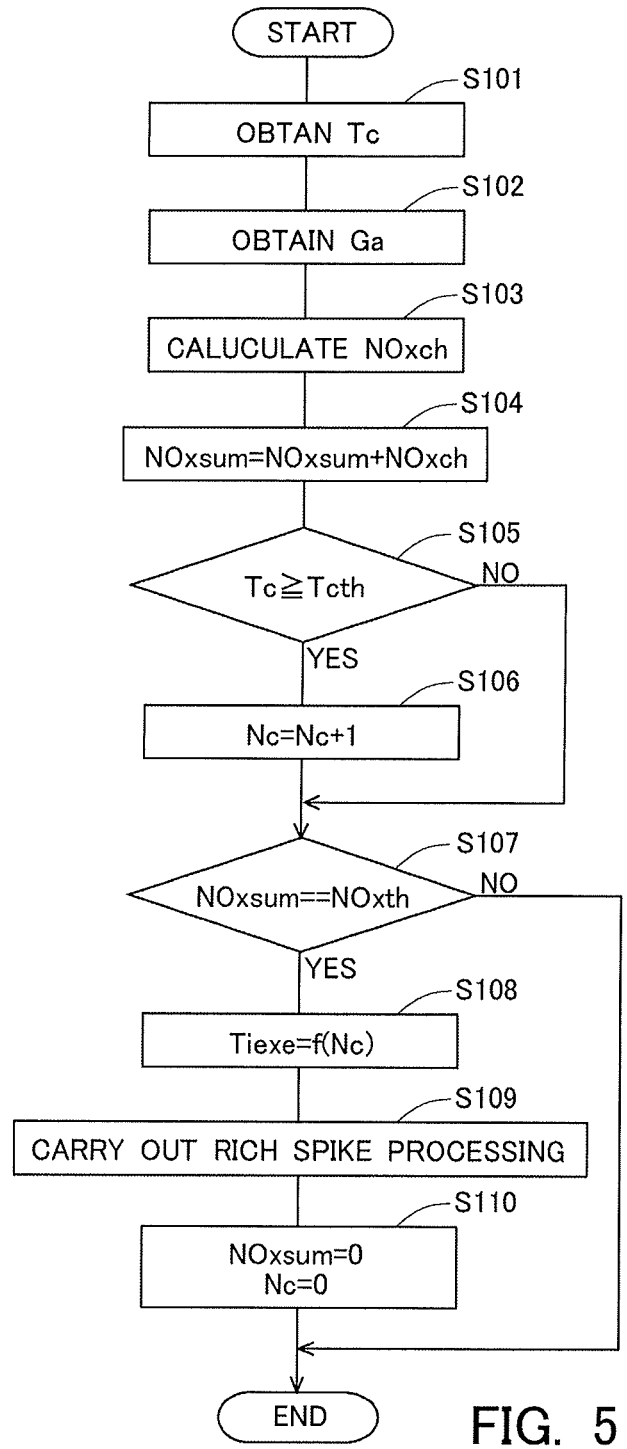
FIG. 5 is a flow chart indicating a control flow according to the first embodiment of the present disclosure.

Next, a control flow or routine carried out in this embodiment will be described based on FIG. 5. FIG. 5 is a flow chart indicating the control flow or routine according to this embodiment. In this embodiment, this routine is carried out at a predetermined operation interval or period Δt in a repeated manner by the ECU 10 during the operation of the internal combustion engine 1.

In this routine, first, in step S101, the catalyst temperature Tc is obtained. In step S101, the catalyst temperature Tc is calculated based on the output value of the temperature sensor 16. Alternatively, in step S101, the catalyst temperature Tc may be estimated based on the engine rotation speed and the engine load of the internal combustion engine 1. At this time, in cases where fuel is added from the fuel addition valve 7, the catalyst temperature Tc may be estimated by taking account of an amount of heat generation of the added fuel.

Subsequently, in step S102, the exhaust gas flow rate Ga is obtained. In step S102, the exhaust gas flow rate Ga is calculated based on the output value of the air flow meter 4.

Thereafter, in step S103, an amount of change of the NOx in the NSR catalyst 6 (hereinafter, sometimes also referred to simply as an "amount of change") NOxch until the present time after this routine was carried out last time is calculated. In step S103, the NOx incoming flow rate is calculated based on the exhaust gas flow rate Ga and the output value of the upstream side NOx sensor 13 obtained in step S102. In addition, the NOx outgoing flow rate is calculated based on the exhaust gas flow rate Ga and the output value of the downstream side NOx sensor 15. Moreover, the amount of change of the NOx in the NSR catalyst 6 per unit time is calculated by adding up the NOx incoming flow rate and the NOx outgoing flow rate. Then, the amount of change NOxch is calculated by multiplying the amount of change of the NOx per unit time by the operation period Δt.

Then, in step S104, the storage amount of NOx NOxsum is calculated. In step S104, the storage amount of NOx NOxsum is calculated by adding the amount of change NOxch calculated in step S103 to the storage amount of NOx NOxsum.

Subsequently, in step S105, it is determined whether the catalyst temperature Tc calculated in step S101 is equal to or higher than the determination temperature Tcth. Here, note that the determination temperature Tcth is as mentioned above. Then, in cases where an affirmative determination is made in step S105, the routine of the ECU 10 goes to the processing of step S106, whereas in cases where a negative determination is made in step S105, the routine of the ECU 10 goes to the processing of step S107.

In cases where an affirmative determination is made in step S105, then in step S106, the high temperature counter Nc is added by 1. In other words, in step S106, a period of time in which the catalyst temperature Tc becomes equal to or higher than the determination temperature Tcth is counted or added to the temperature counter Nc.

Subsequently, in step S107, it is determined whether the storage amount of NOx NOxsum calculated in step S104 becomes the reference amount NOxth. Here, the reference amount NOxth is a threshold value which determines the execution timing of the rich spike processing, as mentioned above. Then, in cases where an affirmative determination is made in step S107, the routine of the ECU 10 goes to the processing of step S108, whereas in cases where a negative determination is made in step S107, the execution of this routine is terminated.

Figure 6:
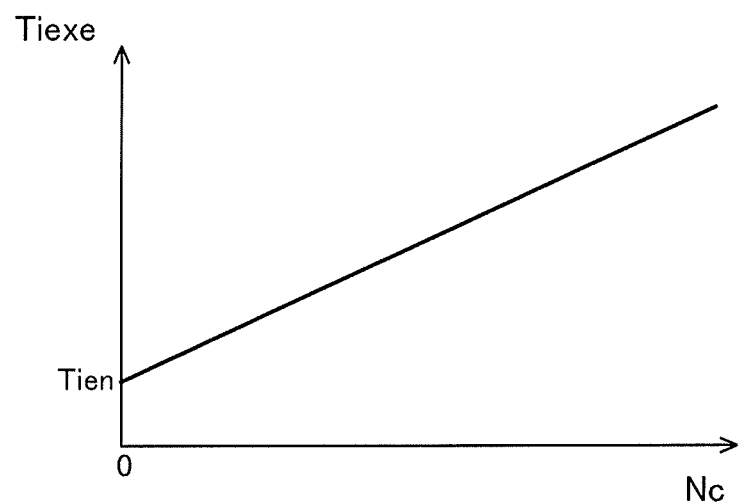
FIG. 6 is a view indicating a correlation between the period of execution and the high temperature counter.

In cases where an affirmative determination is made in step S107, then in step S108, the period of execution Tiexe is calculated. In step S108, the period of execution Tiexe is calculated based on the value of the high temperature counter Nc. Specifically, the period of execution Tiexe and the value of the high temperature counter Nc have a correlation as indicated in FIG. 6. Then, this correlation has been stored in advance in a ROM of the ECU 10 as a function or a map, and in step S108, the period of execution Tiexe is calculated based on the correlation and the value of the high temperature counter Nc counted in step S106. When the value of the high temperature counter Nc is 0, the period of execution Tiexe calculated in this manner becomes the normal period of execution Tien, as indicated in FIG. 6. Then, as the value of the high temperature counter Nc becomes larger from 0, the period of execution Tiexe is made longer from the normal period of execution Tien. In other words, in cases where the storage amount of NOx NOxsum is the reference amount NOxth, the period of execution Tiexe is made longer in the case where the catalyst high temperature period is long than in the case where it is short.

Subsequently, in step S109, the rich spike processing is carried out. In step S109, the rich spike processing is carried out by adding fuel into the exhaust gas discharged from the internal combustion engine 1 with the use of the fuel addition valve 7. However, as mentioned above, the rich spike processing may be carried out by performing rich combustion in a cylinder.

Thereafter, in step S110, the storage amount of NOx NOxsum and the value of the high temperature counter Nc are initialized to 0. Then, after the processing of step S110, the execution of this routine is ended.

In this embodiment, the ECU 10 carries out the control flow or routine as mentioned above, whereby a situation where the stored NOx is not sufficiently reduced even by the execution of the rich spike processing is suppressed, thus making it possible to reduce the stored NOx in an appropriate manner by the execution of the rich spike processing.

Modification of the First Embodiment

Next, reference will be made to a modification of the above-mentioned first embodiment. Here, note that in this modification, a detailed explanation of substantially the same construction and substantially the same control processing as in the first embodiment will be omitted.

Figure 7:
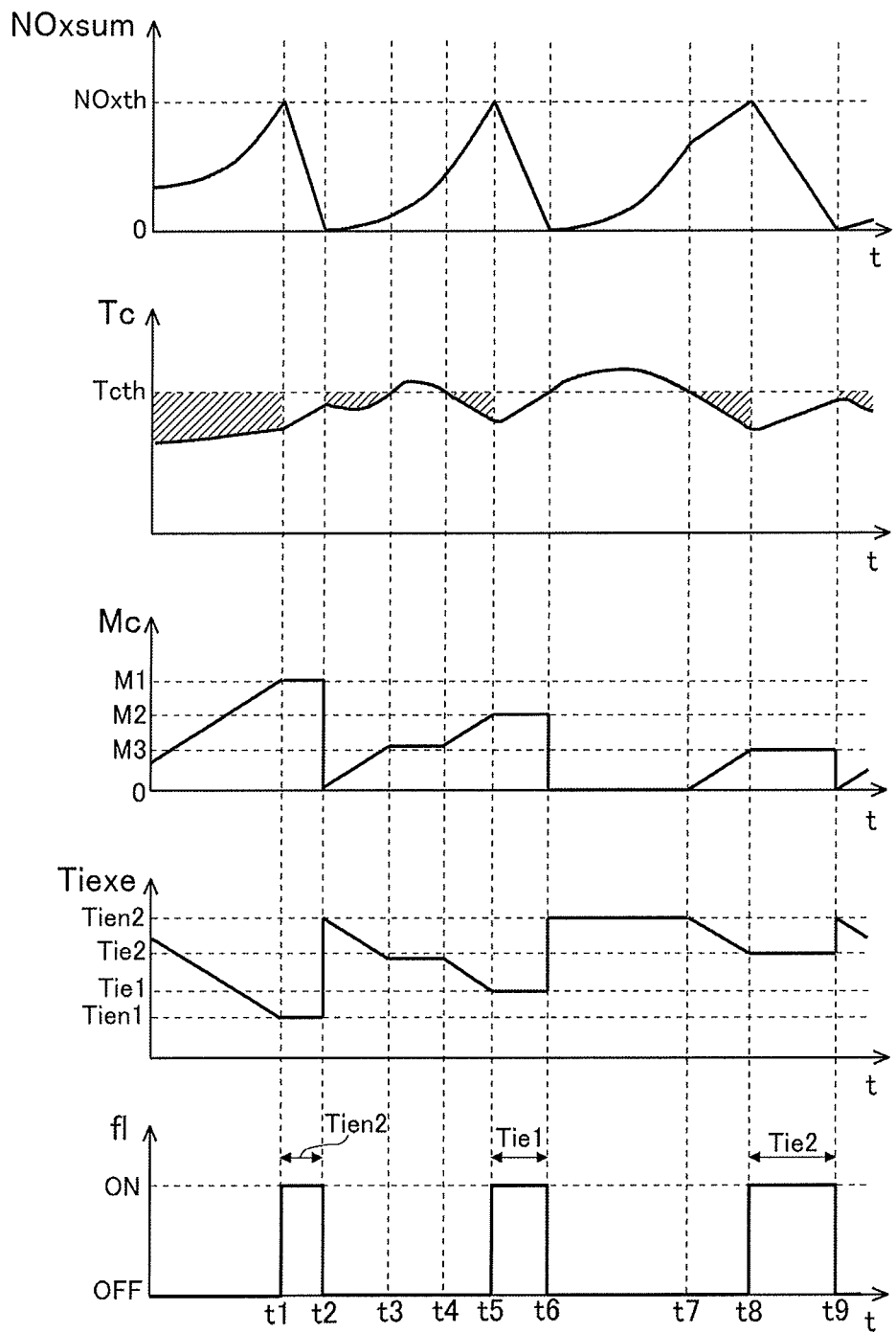
FIG. 7 is a time chart indicating the changes over time of a storage amount of NOx, a catalyst temperature, a low temperature counter, a period of execution, and an execution flag according to a modification of the first embodiment of the present disclosure.

Brief reference will be made to the control processing executed by the ECU 10 in this modification, with the use of a time chart indicated in FIG. 7. FIG. 7 is the time chart indicating the changes over time of a storage amount of NOx NOxsum, a catalyst temperature Tc, a low temperature counter Mc which is a counter for counting a period of time in which the catalyst temperature is less than a determination temperature Tcth, a period of execution tiexe, and an execution flag fl according to this modification of the first embodiment. In this modification, unlike the above-mentioned FIG. 4 of the first embodiment, a period of time in which the catalyst temperature Tc becomes less than the determination temperature Tcth is counted. In addition, the period of execution Tiexe is calculated based on the value of the low temperature counter Mc.

In the control indicated in FIG. 7, the catalyst temperature is less than the determination temperature Tcth in the entire determination period of time from the completion of the execution of the last rich spike processing to the start of the execution of rich spike processing at a time point t1 (the current rich spike processing). As a result, at the time point t1, the low temperature counter becomes M1, and the period of execution is accordingly set to a normal period of execution Tien1. Here, note that this period of time Tien1 corresponds to the period of time Tien described in the above-mentioned explanation of FIG. 4.

Then, at the time point t1, the rich spike processing is started, and the rich spike processing is continued from the time point t1 to a time point t2 which is after the lapse of the normal period of execution Tien1. Here, note that when the execution of the rich spike processing is completed, the low temperature counter is initialized to 0 and the period of execution is also initialized accordingly to a high temperature reference period Tien2. Here, the high temperature reference period Tien2 is a period of execution in the case where the catalyst temperature becomes equal to or higher than the determination temperature Tcth in the entire determination period of time.

Here, when attention is focused on a determination period of time from a time point t2 to a time point t5, as indicated in FIG. 7, the catalyst temperature is less than the determination temperature Tcth in a period of time from the time point t2 to a time point t3 and in a period of time from a time point t4 to the time point t5. In that case, in these periods of time, the counting of time by the low temperature counter is performed, and at the time point t5, the low temperature counter becomes M2. Then, as the value of the low temperature counter is increased, i.e., the period of execution is made shorter from the high temperature reference period Tien2, and at the time point t5, the period of execution is set to Tie1. In addition, at the time point t5, the rich spike processing is started, and the rich spike processing is continued from the time point t5 to a time point t6 which is after the lapse of the period of execution Tie1.

On the other hand, when attention is focused on a determination period of time from the time point t6 to a time point t8, the catalyst temperature is less than the determination temperature Tcth in a period of time from a time point t7 to the time point t8, as indicated in FIG. 7. In that case, at the time point t7, the counting of time by the low temperature counter is started, and at the time point t8, the low temperature counter becomes M3. Then, at the time point t8, the period of execution is accordingly set to Tie2. In addition, at the time point t8, the rich spike processing is started, and the rich spike processing is continued from the time point t8 to a time point t9 which is after the lapse of the period of execution Tie2.

As described above, in this modification, in cases where the storage amount of NOx is the same, the period of execution is made shorter in the case where the period of time in which the catalyst temperature Tc becomes less than the determination temperature Tcth is long than in the case where it is short. Stated in another way, in cases where the storage amount of NOx is the same, the period of execution is made longer in the case where the catalyst high temperature period is long than in the case where it is short. This makes it possible to reduce the stored NOx in an appropriate manner by means of the rich spike processing.

Figure 8:
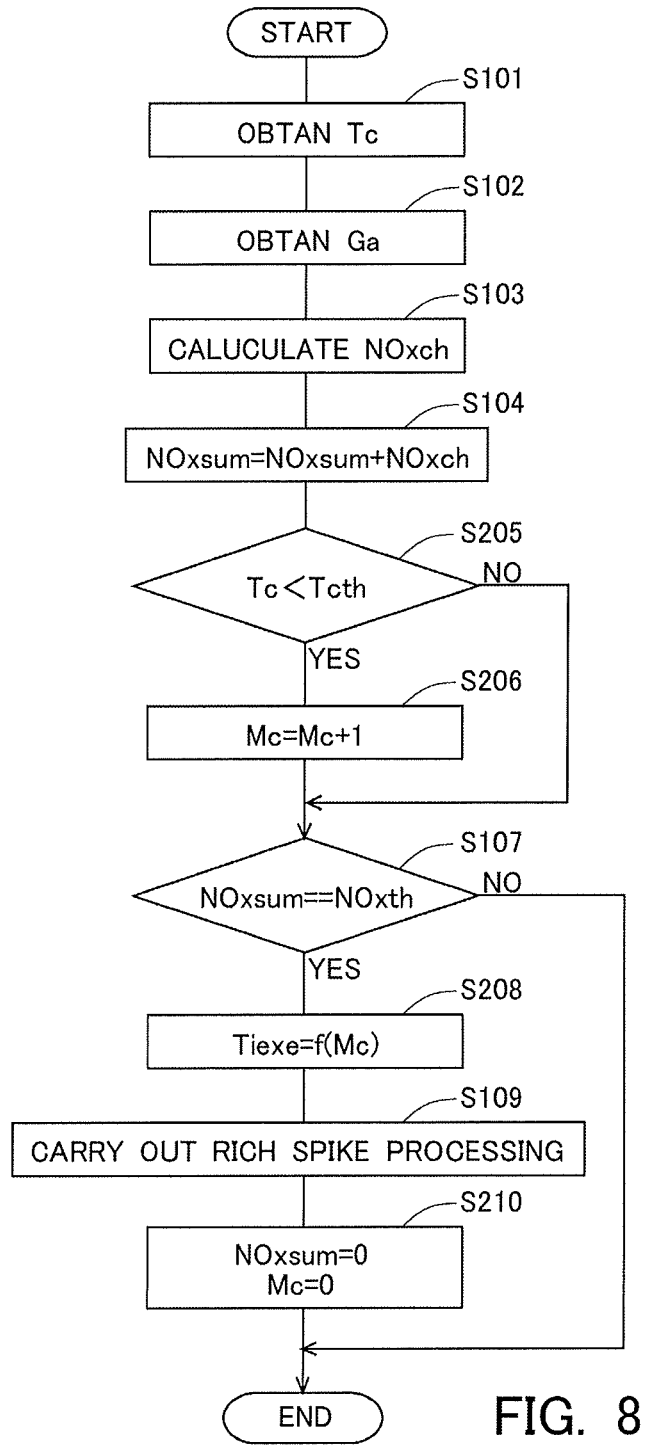
FIG. 8 is a flow chart indicating a control flow according to the modification of the first embodiment of the present disclosure.

Next, a control flow or routine carried out in this modification will be described based on FIG. 8. FIG. 8 is a flow chart indicating a control flow or routine according to this modification. In this modification, this routine is carried out at a predetermined operation interval or period Δt in a repeated manner by the ECU 10 during the operation of the internal combustion engine 1. Here, note that in respective processings indicated in FIG. 8, the same reference signs are attached to the substantially same processings as those indicated in the above-mentioned FIG. 5, and a detailed explanation thereof is omitted.

In the control flow or routine indicated in FIG. 8, after the processing of step S104, it is determined in step S205 whether the catalyst temperature Tc obtained in step S101 is lower than the determination temperature Tcth. Here, note that the determination temperature Tcth is as mentioned above. Then, in cases where an affirmative determination is made in step S205, the routine of the ECU 10 goes to the processing of step S206, whereas in cases where a negative determination is made in step S205, the routine of the ECU 10 goes to the processing of step S107.

In cases where an affirmative determination is made in step S205, then in step S206, the low temperature counter Mc is added by 1. In other words, in step S206, a period of time in which the catalyst temperature Tc becomes less than the determination temperature Tcth is counted. Then, after the processing of step S206, the routine of the ECU 10 goes to the processing of step S107.

Figure 9:
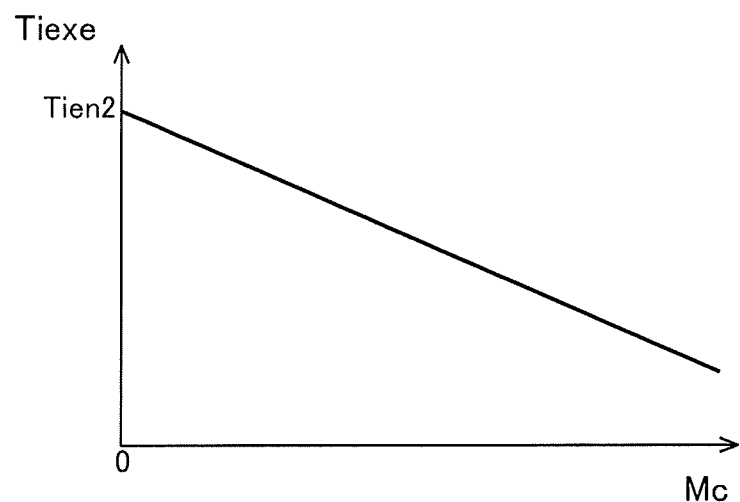
FIG. 9 is a view indicating a correlation between the period of execution and the low temperature counter.

Thereafter, in cases where an affirmative determination is made in step S107, then in step S208, the period of execution Tiexe is calculated. In step S208, the period of execution Tiexe is calculated based on the value of the low temperature counter Mc. Specifically, the period of execution Tiexe and the value of the low temperature counter Mc have a correlation as indicated in FIG. 9. Then, this correlation has been stored in advance in the ROM of the ECU 10 as a function or a map, and in step S208, the period of execution Tiexe is calculated based on the correlation and the value of the low temperature counter Mc counted in step S206. When the value of the low temperature counter Mc is 0, the period of execution Tiexe calculated in this manner becomes the high temperature reference period Tien2, as indicated in FIG. 9. Then, as the value of the low temperature counter Mc becomes larger from 0, the period of execution Tiexe is made shorter from the high temperature reference period Tien2. In addition, after the processing of step S208, the routine of the ECU 10 goes to the processing of step S109.

Subsequently, after the processing of step S109, the storage amount of NOx NOxsum and the value of the low temperature counter Mc are initialized to 0 in step S210. Then, after the processing of step S210, the execution of this routine is ended.

The execution of the above-mentioned control flow or routine by the ECU 10 also makes it possible to reduce the stored NOx in an appropriate manner by means of the rich spike processing.

Second Embodiment

Next, reference will be made to a second embodiment of the present disclosure based on FIGS. 10 and 11. Here, note that in this second embodiment, a detailed explanation of substantially the same construction and substantially the same control processing as in the above-mentioned first embodiment will be omitted.

In the above-mentioned first embodiment, in cases where the storage amount of NOx is the same, the ECU 10 makes the period of execution of the rich spike processing longer in the case where the catalyst high temperature period is long than in the case where it is short. On the other hand, in this second embodiment, in cases where the storage amount of NOx is the same, the ECU 10 makes the degree of richness of the rich air fuel ratio achieved by the execution of the rich spike processing larger in the case where the catalyst high temperature period is long than in the case where it is short. With this, the stored NOx becomes easy to be reduced, thus making it possible to reduce the stored NOx in an appropriate manner by means of the rich spike processing.

Brief reference will be made to the control processing executed by the ECU 10 in this second embodiment, with the use of a time chart indicated in FIG. 10. FIG. 10 is the time chart indicating the changes over time of a storage amount of NOx NOxsum, a catalyst temperature Tc, a high temperature counter Nc, a set value Rexe of the rich air fuel ratio achieved by the execution of the rich spike processing (hereinafter, sometimes also referred to as a "set value of the rich air fuel ratio"), and an execution flag fl. Here, note that in this second embodiment, unlike the above-mentioned FIG. 4, the period of execution of the rich spike processing is fixed to the normal period of execution Tien.

Figure 10:
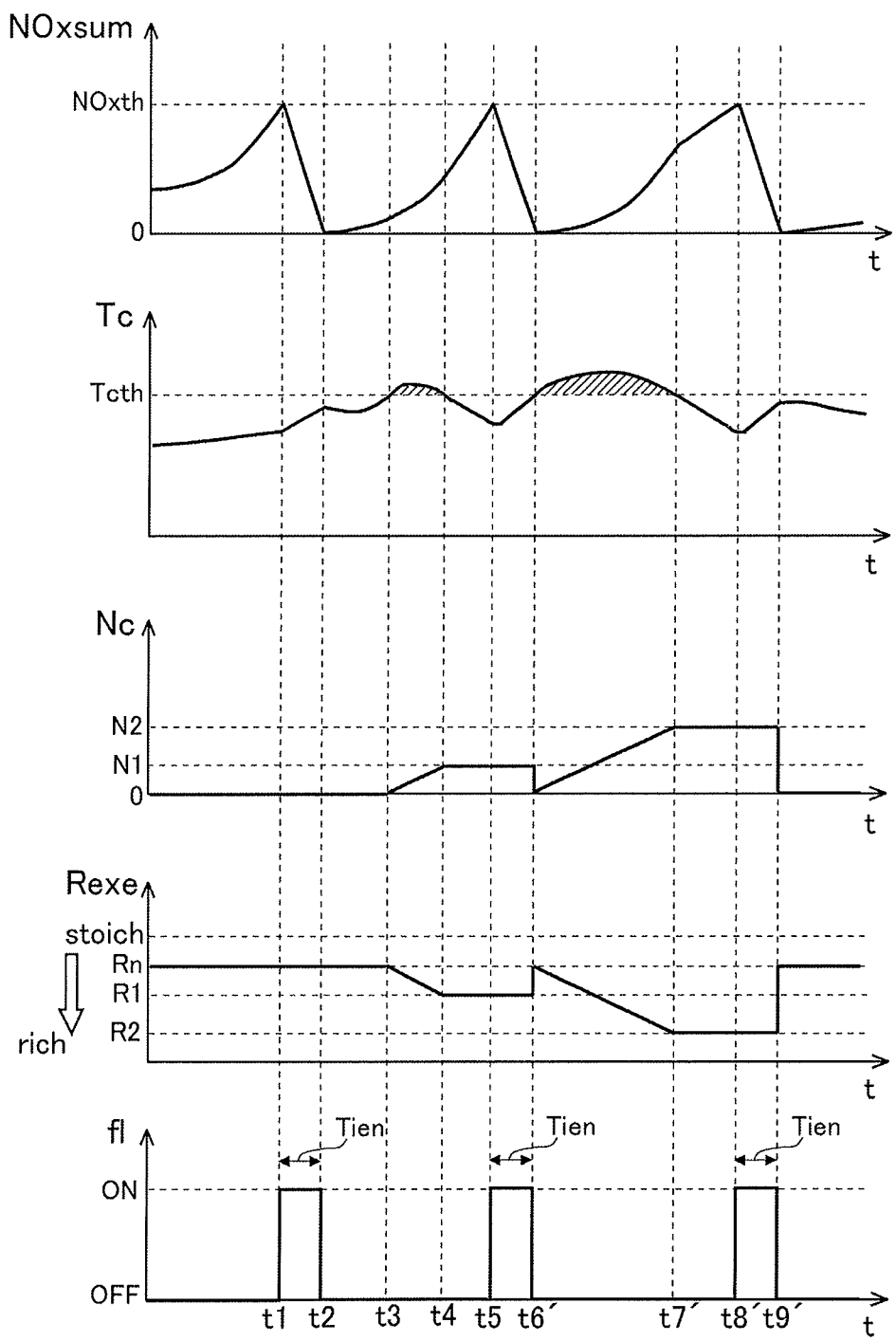
FIG. 10 is a time chart indicating the changes over time of a storage amount of NOx, a catalyst temperature, a high temperature counter, a set value of a rich air fuel ratio, and an execution flag according to a second embodiment of the present disclosure.
Figure 11:
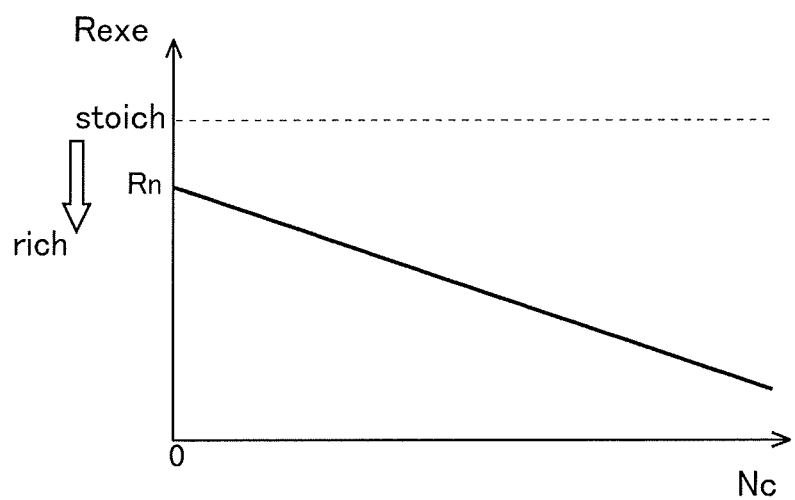
FIG. 11 is a view indicating a correlation between the set value of the rich air fuel ratio and the high temperature counter.

In the control indicated in FIG. 10, as the value of the high temperature counter is increased, i.e., as the catalyst high temperature period becomes longer, the set value of the rich air fuel ratio is made to a richer side value. Stated in another way, as the catalyst high temperature period becomes longer, the degree of richness of the rich air fuel ratio is made larger. Here, in cases where the catalyst temperature becomes less than the determination temperature Tcth in the entire determination period of time, the set value of the rich air fuel ratio is made to a normal rich air fuel ratio Rn.

In addition, as indicated in FIG. 10, at a time point t4, the high temperature counter becomes N1, and the set value of the rich air fuel ratio is accordingly made to R1 which has a degree of richness larger than the normal rich air fuel ratio Rn. Then, at a time point t5, the rich spike processing is started, and the rich spike processing is continued from the time point t5 to a time point t6' which is after the lapse of the normal period of execution Tien. The rich air fuel ratio achieved by the execution of this rich spike processing is the above-mentioned R1. In this case, as compared with the case where the air fuel ratio is made to the normal rich air fuel ratio Rn, the stored NOx becomes easier to be reduced, thus making it possible to reduce the stored NOx in an appropriate manner by the rich spike processing.

Moreover, as indicated in FIG. 10, the value N2 of the high temperature counter related to the rich spike processing started at a time point t8' is larger than the value N1 of the high temperature counter related to the rich spike processing started at the time point t5, and accordingly, the set value of the rich air fuel ratio related to the rich spike processing started at the time point t8' is made to R2 which has a degree of richness larger than the set value R1 of the rich air fuel ratio related to the rich spike processing started at the time point t5. Then, at the time point t8', the rich spike processing is started, and the rich spike processing is continued from the time point t8' to a time point t9' which is after the lapse of the normal period of execution Tien. Here, the ECU 10 carries out the current rich spike processing by making an amount of fuel to be added per unit time from the fuel addition valve 7 more than that in the last rich spike processing started from the time point t5. With this, the rich air fuel ratio achieved by the execution of the current rich spike processing becomes R2 which has a degree of richness larger than R1. In that case, as compared with the last rich spike processing, the stored NOx becomes easier to be reduced. Here, note that in cases where the rich spike processing is carried out by carrying out rich combustion in a cylinder, the ECU 10 may carry out the current rich spike processing by making the degree of richness of a rich mixture in the rich combustion larger than that in the last rich spike processing.

Next, a control flow or routine carried out in this second embodiment will be described based on the above-mentioned FIG. 5. In this second embodiment, in cases where an affirmative determination is made in step S107 as indicated in the above-mentioned FIG. 5, the set value Rexe of the rich air fuel ratio is calculated in place of the processing of step S108 indicated in the above-mentioned FIG. 5. In this processing, the set value Rexe of the rich air fuel ratio is calculated based on the value of the high temperature counter Nc. Specifically, the set value Rexe of the rich air fuel ratio and the value of the high temperature counter Nc have a correlation as indicated in FIG. 11. Then, this correlation has been stored in advance in the ROM of the ECU 10 as a function or a map, and the set value Rexe of the rich air fuel ratio is calculated based on this correlation and the value of the high temperature counter Nc counted in step step S106. The set value Rexe of the rich air fuel ratio calculated in this manner becomes the normal rich air fuel ratio Rn when the value of the high temperature counter Nc is 0, as indicated in FIG. 11. Then, as the value of the high temperature counter Nc becomes larger from 0, the set value Rexe of the rich air fuel ratio is made to a richer side value than the normal rich air fuel ratio Rn. In other words, in cases where the storage amount of NOx NOxsum is the reference amount NOxth, the degree of richness of the rich air fuel ratio is made larger in the case where the catalyst high temperature period is long than in the case where it is short.

Then, in step S109, the rich spike processing is carried out so that the rich air fuel ratio achieved by the rich spike processing becomes the set value Rexe of the rich air fuel ratio as mentioned above. As a result of this, the stored NOx becomes easy to be reduced.

The execution of such a control flow or routine by the ECU 10 also makes it possible to reduce the stored NOx in an appropriate manner by means of the rich spike processing. Here, note that the ECU 10 may calculate the period of execution Tiexe and the set value Rexe of the rich air fuel ratio based on the value of the high temperature counter Nc, and may carry out the rich spike processing by using these as execution parameters. In this case, the ECU 10 can make the period of execution of the rich spike processing longer, and the degree of richness of the rich air fuel ratio achieved by the rich spike processing larger, in the case where the catalyst high temperature period is long than in the case where it is short.

Third Embodiment

Next, reference will be made to a third embodiment of the present disclosure based on FIGS. 12 and 13. Here, note that in this third embodiment, a detailed explanation of substantially the same construction and substantially the same control processing as in the above-mentioned first embodiment will be omitted.

In the above-mentioned embodiments, in cases where the storage amount of NOx is the same, the ECU 10 makes the period of execution of the rich spike processing longer, and/or makes the degree of richness of the rich air fuel ratio achieved by the execution of the rich spike processing larger, in the case where the catalyst high temperature period is long than in the case where it is short. In this third embodiment, in addition to the above, in cases where the storage amount of NOx is the same, the ECU 10 makes the period of execution of the rich spike processing longer, and/or makes the degree of richness of the rich air fuel ratio achieved by the execution of the rich spike processing larger, in the case where a mean temperature of the NSR catalyst 6 at the time when the catalyst temperature becomes equal to or higher than a determination temperature is high than in the case where it is low, in the determination period of time.

Here, the higher the catalyst temperature, the easier it becomes for NOx to be stored into the NSR catalyst 6 as nitrates. For that reason, even if the catalyst high temperature period is the same, the higher than the determination temperature the catalyst temperature at that time becomes, the easier it becomes for NOx to be stored into the NSR catalyst 6 as nitrates. Accordingly, under the condition that a large amount of nitrates relatively hard to be reduced may be produced, the ECU 10 carries out the above control in order to suppress a situation where the stored NOx is not reduced to a sufficient extent.

Figure 12:
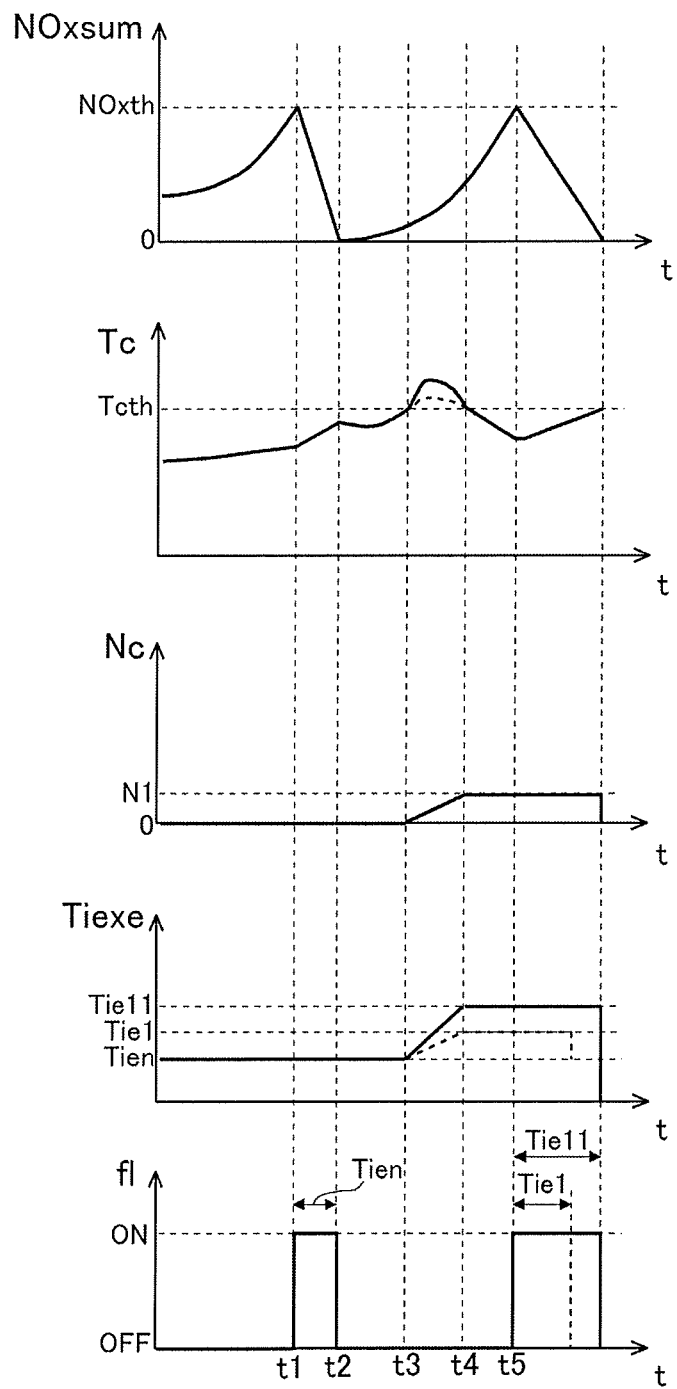
FIG. 12 is a time chart indicating the changes over time of a storage amount of NOx, a catalyst temperature, a high temperature counter, a period of execution, and an execution flag according to a third embodiment of the present disclosure.

Reference will be briefly made to a first mode of the control processing carried out by the ECU 10 in this third embodiment, with the use of a time chart indicated in FIG. 12. FIG. 12 is the time chart indicating the changes over time of a storage amount of NOx NOxsum, a catalyst temperature Tc, a high temperature counter Nc, a period of execution Tiexe, and an execution flag fl. Here, note that in the control indicated in FIG. 12, in a determination period of time, the period of execution is made longer in the case where the mean temperature of the NSR catalyst 6 at the time when the catalyst temperature becomes equal to or higher than the determination temperature Tcth is high than in the case where it is low. In addition, in FIG. 12, the changes over time of the catalyst temperature, the period of execution and the execution flag, indicated in the above-mentioned FIG. 4, are indicated by broken lines as references.

As indicated in FIG. 12, in a determination period of time from a time point t2 to a time point t5, the catalyst temperature is equal to or higher than the determination temperature Tcth in a period of time from a time point t3 to a time point t4. Then, the catalyst temperature at this time is higher than the catalyst temperature indicated in the above-mentioned FIG. 4, in the entire period of time from the time point t3 to the time point t4. In other words, the mean temperature of the NSR catalyst 6 in the period of time from the time point t3 to the time point t4 in which the catalyst temperature is equal to or higher than the determination temperature Tcth becomes higher than the mean temperature of the NSR catalyst 6 in that period of time indicated in the above-mentioned FIG. 4. For that reason, at the time point t4, the period of execution is set to a period of time Tie11 which is longer than the period of time Tie1 indicated in the above-mentioned FIG. 4.

Then, at the time point t5, the rich spike processing is started, and the rich spike processing is continued from the time point t5 for the period of execution Tie11. With this, even if nitrates increase in the stored NOx as the catalyst temperature becomes higher than the determination temperature Tcth so that a situation becomes easy to occur where the stored NOx is not reduced to a sufficient extent, the stored NOx can be reduced in an appropriate manner. In other words, it becomes possible to reduce the stored NOx in an appropriate manner by the execution of the rich spike processing.

Figure 13:
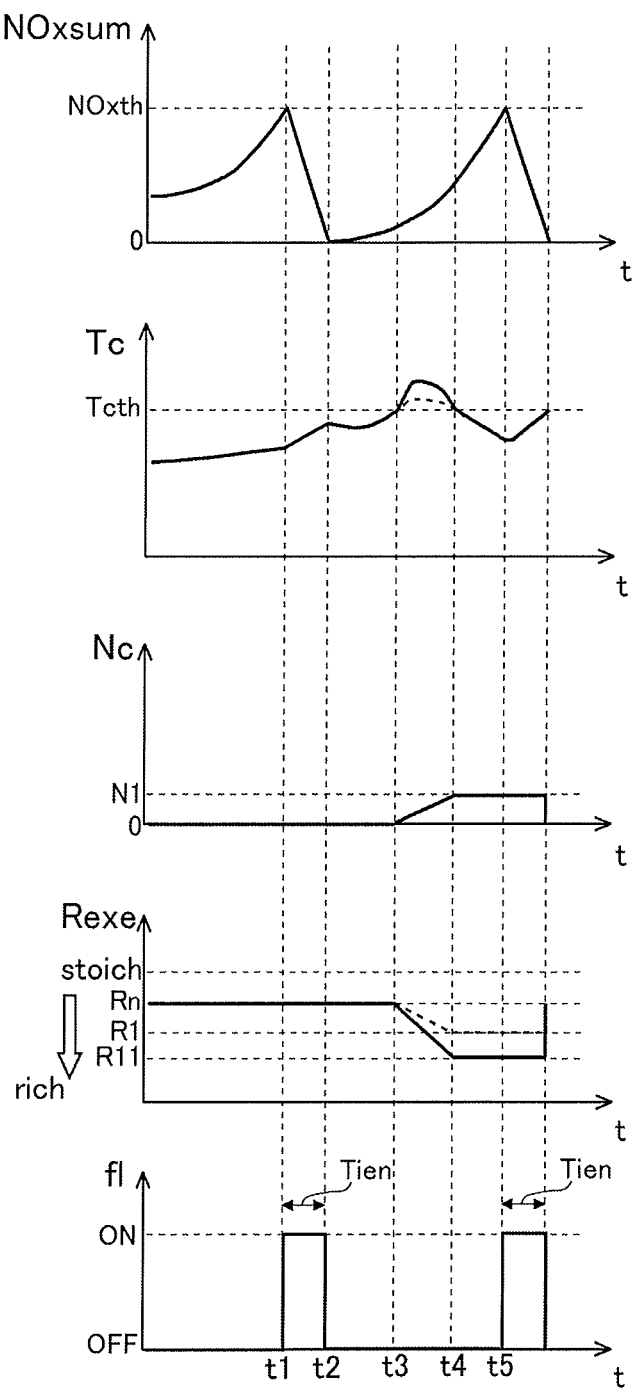
FIG. 13 is a time chart indicating the changes over time of a storage amount of NOx, a catalyst temperature, a high temperature counter, a set value of a rich air fuel ratio, and an execution flag according to a third embodiment of the present disclosure.

Next, reference will be briefly made to a second mode of the control processing carried out by the ECU 10 in this third embodiment, with the use of a time chart indicated in FIG. 13. FIG. 13 is the time chart indicating the changes over time of a storage amount of NOx NOxsum, a catalyst temperature Tc, a high temperature counter Nc, a set value Rexe of the rich air fuel ratio, and an execution flag fl. Here, note that in the control indicated in FIG. 13, in the above-mentioned determination period of time, the degree of richness of the rich air fuel ratio is made larger in the case where the mean temperature of the NSR catalyst 6 at the time when the catalyst temperature becomes equal to or higher than the determination temperature Tcth is high than in the case where it is low. In addition, in FIG. 13, the changes over time of the catalyst temperature and the value of the rich air fuel ratio, indicated in the above-mentioned FIG. 10, are indicated by broken lines as references.

In the control indicated in FIG. 13, too, the catalyst temperature is higher than the catalyst temperature indicated in the above-mentioned FIG. 10 in the entire period of time from the time point t3 to the time point t4. In other words, the mean temperature of the NSR catalyst 6 in the period of time from the time point t3 to the time point t4 in which the catalyst temperature is equal to or higher than the determination temperature Tcth becomes higher than the mean temperature of the NSR catalyst 6 in that period of time indicated in the above-mentioned FIG. 10. For that reason, at the time point t4, the set value of the rich air fuel ratio becomes R11 which has a degree of richness larger than R1 indicated in the above-mentioned FIG. 10.

Then, at the time point t5, the rich spike processing is started, and the rich spike processing is continued from the time point t5 for a normal period of execution Tien. The rich air fuel ratio achieved by the execution of this rich spike processing is the above-mentioned R11. In this case, as compared with the case where the set value of the air fuel ratio is made to R1, the stored NOx becomes easier to be reduced, thus making it possible to reduce the stored NOx in an appropriate manner by the rich spike processing.

Fourth Embodiment

Next, reference will be made to a fourth embodiment of the present disclosure based on FIG. 14. Here, note that in this fourth embodiment, a detailed explanation of substantially the same construction and substantially the same control processing as in the above-mentioned first embodiment will be omitted.

In this fourth embodiment, the ECU 10 calculates an amount of the nitrates stored in the NSR catalyst 6 (hereinafter, sometimes also referred to as a "storage amount of nitrates") based on the catalyst temperature. Here, when the ratio of the storage amount of nitrates with respect to the storage amount of NOx is defined as a nitrate ratio, in the case where the rich spike processing is carried out in a state where the nitrate ratio is high, the stored NOx becomes harder to be reduced, in comparison with the case where the rich spike processing is carried out in a state where the nitrate ratio is low, even if the storage amount of NOx is the same. Accordingly, the ECU 10 controls, based on the nitrate ratio, the period of execution of the rich spike processing and/or the degree of richness of the rich air fuel ratio achieved by the execution of the rich spike processing. Specifically, even if the storage amount of NOx is the same, the ECU 10 can make the period of execution of the rich spike processing longer, and/or can make the degree of richness of the rich air fuel ratio achieved by the execution of the rich spike processing larger, in the case where the nitrate ratio is high than in the case where it is low. As a result of this, even in the case where the rich spike processing is carried out in the state where the nitrate ratio is high, the stored NOx can be reduced similarly as in the case where the rich spike is carried out in the state where the nitrate ratio is low.

Here, a control flow or routine carried out in this fourth embodiment will be described based on FIG. 14. FIG. 14 is a flow chart indicating the control flow or routine according to this fourth embodiment. In this fourth embodiment, this routine is carried out at a predetermined operation interval or period Δt in a repeated manner by the ECU 10 during the operation of the internal combustion engine 1. Here, note that in respective processings indicated in FIG. 14, the same reference signs are attached to the substantially same processings as those indicated in the above-mentioned FIG. 5, and a detailed explanation thereof is omitted.

Figure 14:
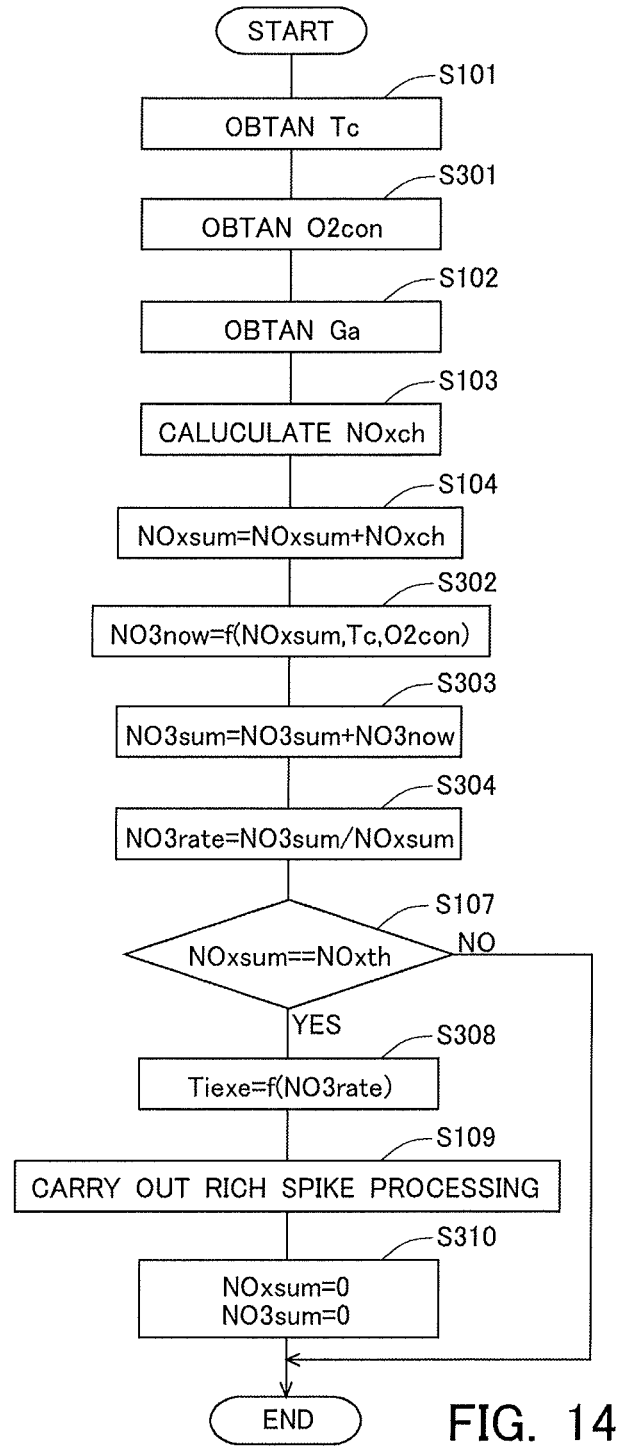
FIG. 14 is a flow chart indicating a control flow according to a fourth embodiment of the present disclosure.

In the control routine indicated in FIG. 14, after the processing of step S101, an oxygen concentration O2con of an incoming exhaust gas is obtained in step S301. In step S301, the oxygen concentration O2con of the incoming exhaust gas is calculated based on the output value of the air fuel ratio sensor 14. Then, after the processing of step S301, the routine of the ECU 10 goes to the processing of step S102.

In addition, in the control flow indicated in FIG. 14, in step S302 after the processing of step S104, an amount of production of nitrates (hereinafter, sometimes also referred to as a "current production amount") NO3 now to be produced in a current state of the NSR catalyst 6 (i.e., the storage amount of NOx, the catalyst temperature and the oxygen concentration) is calculated. In step S302, a production rate of nitrates is calculated based on the storage amount of NOx NOxsum calculated in step S104, the catalyst temperature Tc obtained in step S101, and the oxygen concentration O2con of the incoming exhaust gas obtained in step S301. This production rate of nitrates is calculated by the following expression 1.

$$NO3reac = A \cdot \exp\left(-\frac{Ea}{R \cdot Tc}\right) \times NO2sum^a \times O2con^b \quad \text{Expression 1}$$

NO3reac: the production rate of nitrates,
Tc: the catalyst temperature,
NO2sum: the storage amount of nitrites,
O2con: the oxygen concentration,
R: a gas constant, and
A, Ea, a, b: empirical constants.

Then, the current production amount NO3now is calculated by multiplying the production rate of nitrates NO3reac by the operation period Δt.

Here, the storage amount of nitrites NO2sum is an amount of the nitrites stored in the NSR catalyst 6, and is calculated by the following expression 2.

NO2sum=NO2old+NOxch  Expression 2,

NO2sum: the storage amount of nitrites,
NO2old: the last storage amount of nitrites, and
NOxch: an amount of change.

In other words, the NOx having flowed into the NSR catalyst 6 can once turn into nitrites and can be stored into the NSR catalyst 6, so the change of NOx in the NSR catalyst 6 until the present time after this routine was carried out last time is all assumed to be the change of nitrites. Then, the storage amount of nitrites NO2sum is calculated by adding the last amount of nitrites stored in the NSR catalyst 6 to the amount of change NOxch.

Subsequently, in step S303, the storage amount of nitrates NO3sum is calculated. In step S303, the storage amount of nitrates NO3sum is calculated by adding the current production amount NO3now calculated in step S302 to the storage amount of nitrates NO3sum.

Then, in step S304, the nitrate ratio NO3rate is calculated. In step S304, the nitrate ratio NO3rate is calculated by dividing the storage amount of nitrates NO3sum calculated in step S303 by the storage amount of NOx NOxsum calculated in step S104. Then, after the processing of step S304, the routine of the ECU 10 goes to the processing of step S107.

Thereafter, in cases where an affirmative determination is made in step S107, then in step S308, the period of execution Tiexe is calculated. In step S308, the period of execution Tiexe is calculated based on the nitrate ratio NO3rate calculated in step S304. Specifically, in cases where the storage amount of NOx NOxsum is the reference amount NOxth, the period of execution Tiexe is made longer in the case where the nitrate ratio NO3rate is high than in the case where it is low. In addition, after the processing of step S308, the routine of the ECU 10 goes to the processing of step S109.

Subsequently, after the processing of step S109, the storage amount of NOx NOxsum and the storage amount of nitrates NO3sum are initialized to 0 in step S310. Then, after the processing of step S310, the execution of this routine is ended.

Here, note that in this fourth embodiment, in cases where an affirmative determination is made in step S107, the set value Rexe of the rich air fuel ratio may be calculated in place of the processing of step S308. In this case, the set value Rexe of the rich air fuel ratio is calculated based on the nitrate ratio NO3rate calculated in step S304. Specifically, in cases where the storage amount of NOx NOxsum is the reference amount NOxth, the degree of richness of the rich air fuel ratio is made larger in the case where the nitrate ratio NO3rate is high than in the case where it is low. In addition, the ECU 10 may make the period of execution of the rich spike processing longer, and the degree of richness of the rich air fuel ratio achieved by the rich spike processing larger, in the case where the nitrate ratio is high than in the case where it is low.

The execution of the above-mentioned control flow or routine by the ECU 10 makes it possible to reduce the NOx stored in the NSR catalyst 6 in an appropriate manner by means of the rich spike processing.

What is claimed is:

1. An exhaust gas purification apparatus for an internal combustion engine which performs lean burn operation, the apparatus comprising:
    an NOx storage reduction catalyst that is arranged in an exhaust passage of the internal combustion engine; and
    a controller comprising at least one processor is configured to carry out rich spike to temporarily change an air fuel ratio of an exhaust gas flowing into the NOx storage reduction catalyst from a lean air fuel ratio higher than a stoichiometric air fuel ratio into a rich air fuel ratio lower than the stoichiometric air fuel ratio; wherein
    the controller calculates a storage amount of NOx which is an amount of NOx stored in the NOx storage reduction catalyst;
    wherein in cases where the storage amount of NOx is the same, in a period of time from the completion of the execution of the last rich spike to the start of the execution of the current rich spike, the controller makes a period of execution of the current rich spike longer, and/or a degree of richness of the rich air fuel ratio achieved by the execution of the current rich spike larger, in the case where a period of time in which a temperature of the NOx storage reduction catalyst becomes equal to or higher than a predetermined determination temperature is long than in the case where it is short.

2. The exhaust gas purification apparatus for an internal combustion engine as set forth in claim 1, wherein
    in cases where the storage amount of NOx is the same, in the period of time from the completion of the execution of the last rich spike to the start of the execution of the current rich spike, the controller makes the period of execution of the current rich spike longer, and/or makes the degree of richness of the rich air fuel ratio achieved by the execution of the current rich spike larger, in the case where a mean temperature of the NOx storage reduction catalyst at the time when the temperature of the NOx storage reduction catalyst becomes higher than the predetermined determination temperature is high than in the case where it is low.

3. An exhaust gas purification apparatus for an internal combustion engine which performs lean burn operation, the apparatus comprising:
    an NOx storage reduction catalyst that is arranged in an exhaust passage of the internal combustion engine; and
    a controller comprising at least one processor is configured to carry out rich spike to temporarily change an air fuel ratio of an exhaust gas flowing into the NOx storage reduction catalyst from a lean air fuel ratio higher than a stoichiometric air fuel ratio into a rich air fuel ratio lower than the stoichiometric air fuel ratio; wherein the controller calculates a storage amount of NOx which is an amount of NOx stored in the NOx storage reduction catalyst;

the controller that calculates, based on a temperature of the NOx storage reduction catalyst, a storage amount of nitrates which is an amount of nitrates stored in the NOx storage reduction catalyst; and the controller calculates a nitrate ratio, which is a ratio of the storage amount of nitrates with respect to the storage amount of NOx, based on the storage amount of NOx and the storage amount of nitrates;

wherein in cases where the storage amount of NOx is the same, the controller makes a period of execution of the rich spike longer, and/or makes a degree of richness of the rich air fuel ratio achieved by the execution of the current rich spike larger, in the case where the nitrate ratio is high than in the case where it is low.

* * * * *